Jan. 20, 1959 W. H. WILCOX 2,869,439
CARTON SETTING UP MACHINE
Filed Dec. 9, 1954 12 Sheets-Sheet 1
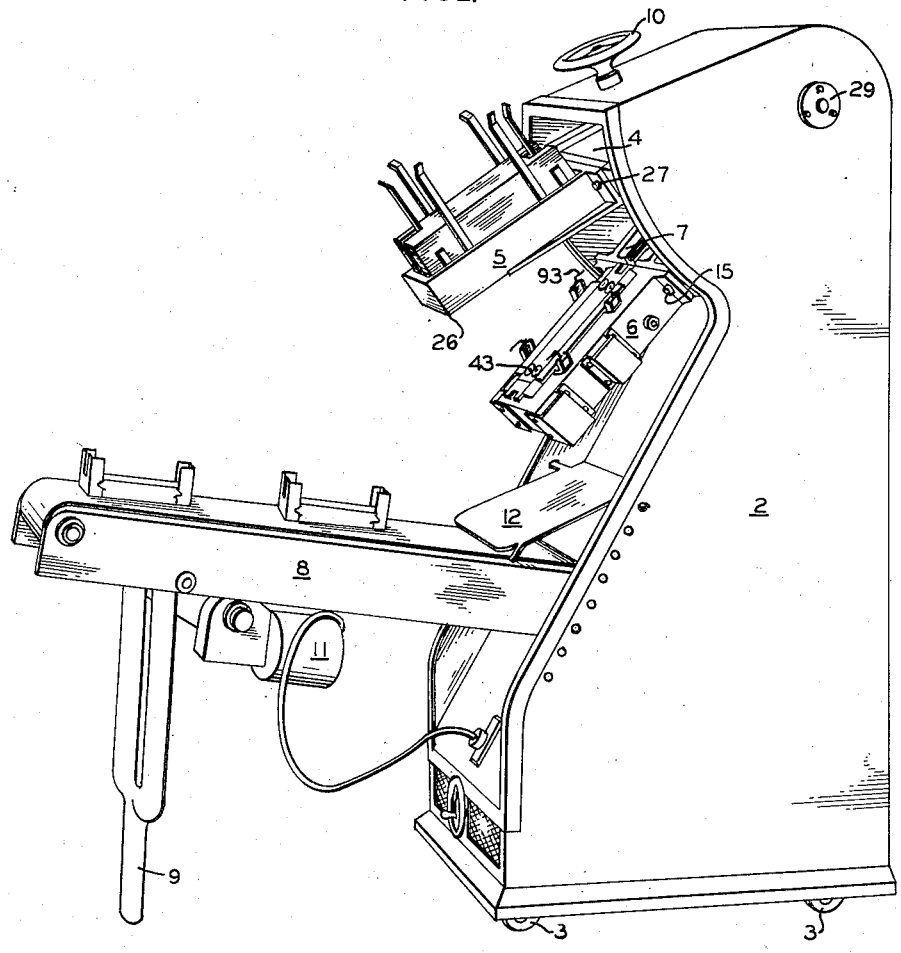
FIG_1
INVENTOR.
WILLIAM H. WILCOX
BY Fryer & Johnson
ATTORNEYS

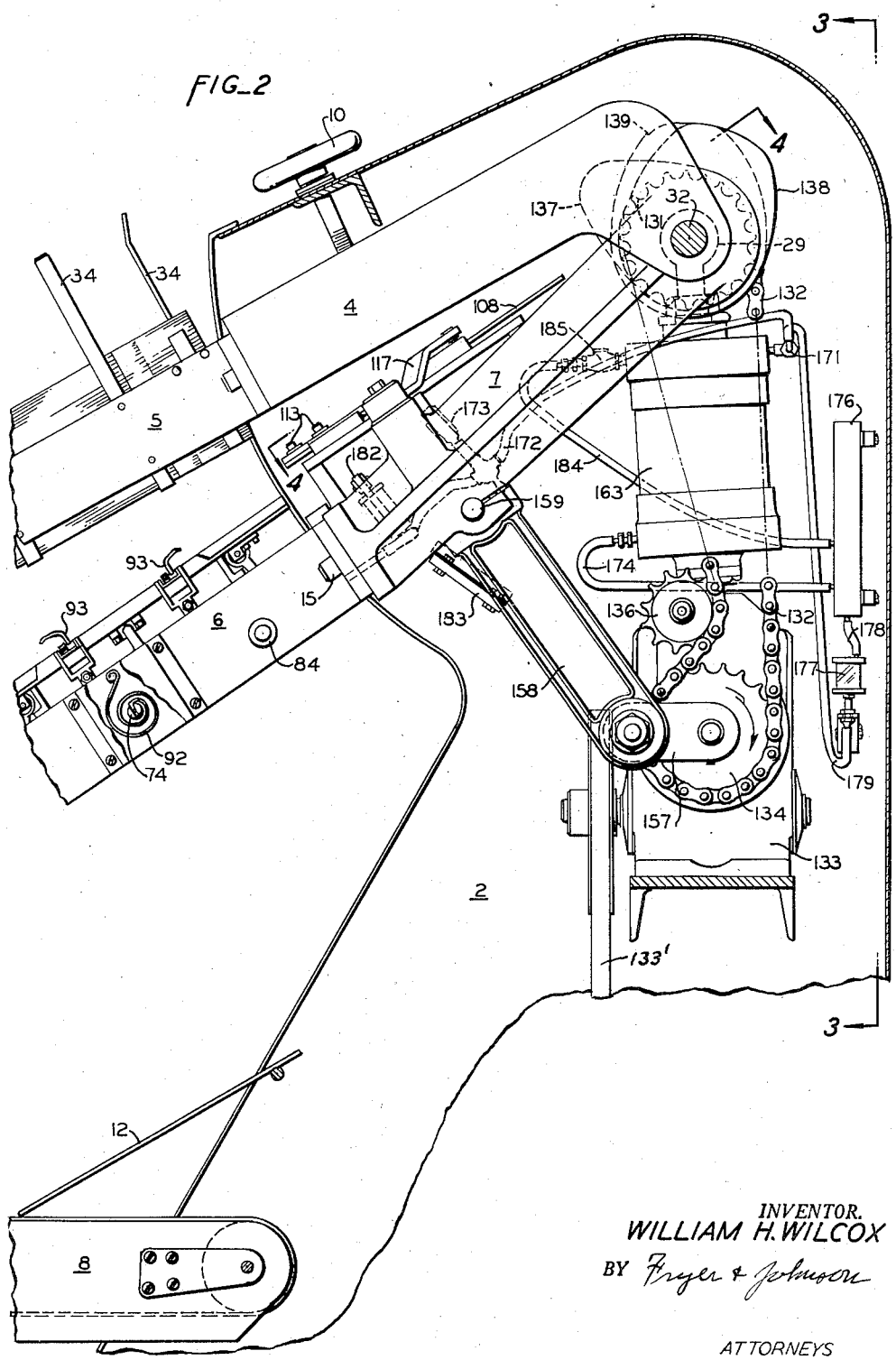

Jan. 20, 1959 W. H. WILCOX 2,869,439
CARTON SETTING UP MACHINE
Filed Dec. 9, 1954 12 Sheets-Sheet 3
FIG_3
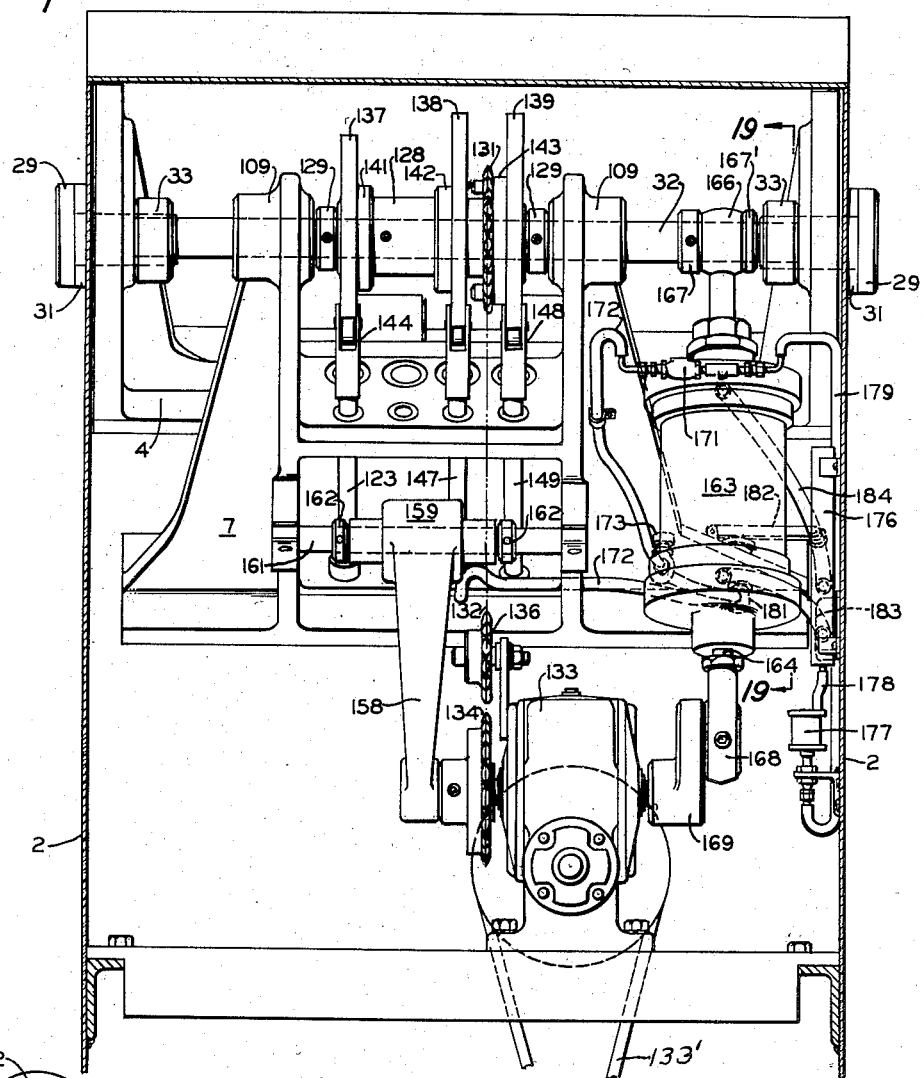
FIG_19
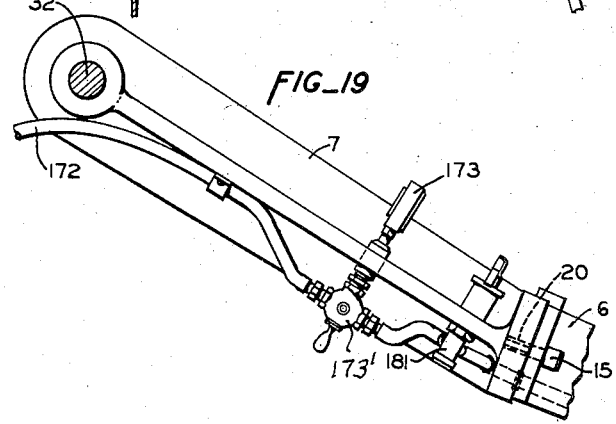
INVENTOR.
WILLIAM H. WILCOX
BY
ATTORNEYS

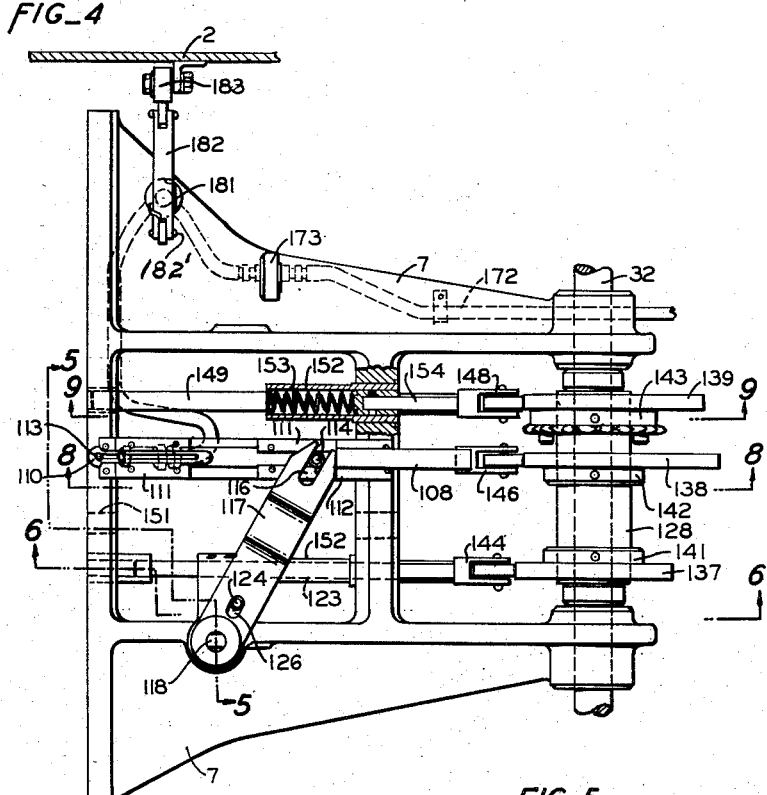
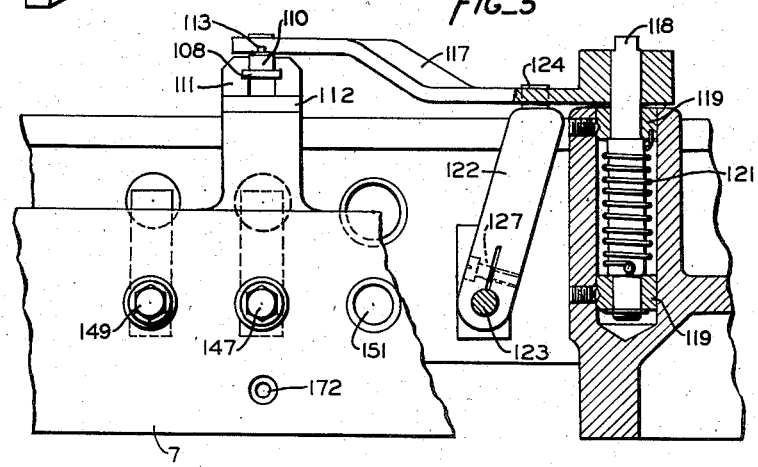

Jan. 20, 1959 W. H. WILCOX 2,869,439
CARTON SETTING UP MACHINE
Filed Dec. 9, 1954 12 Sheets-Sheet 5
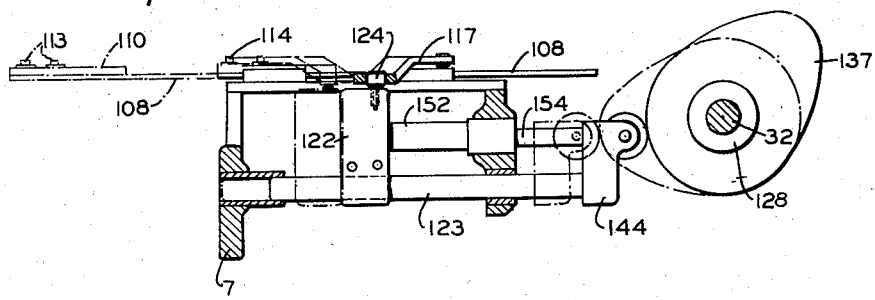
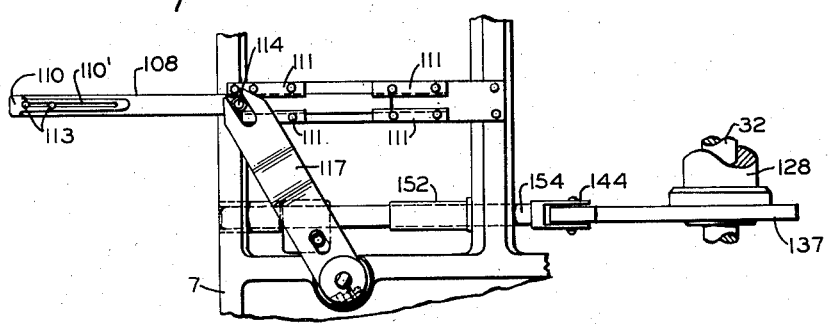
INVENTOR.
WILLIAM H. WILCOX
BY
ATTORNEYS

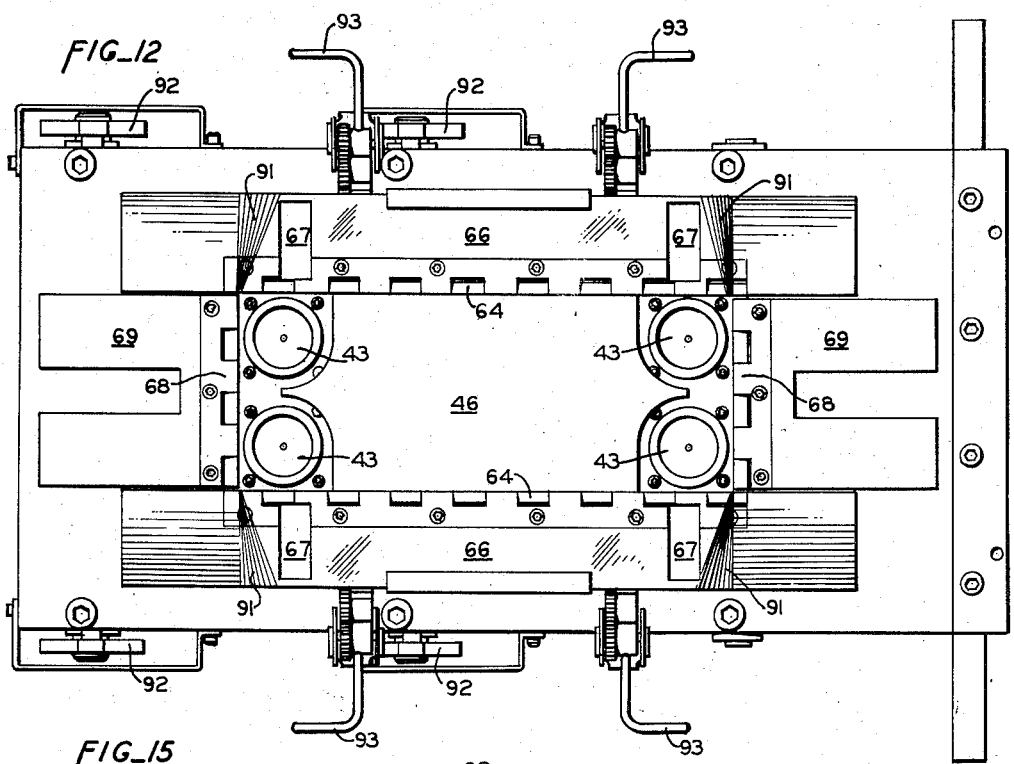
FIG_12
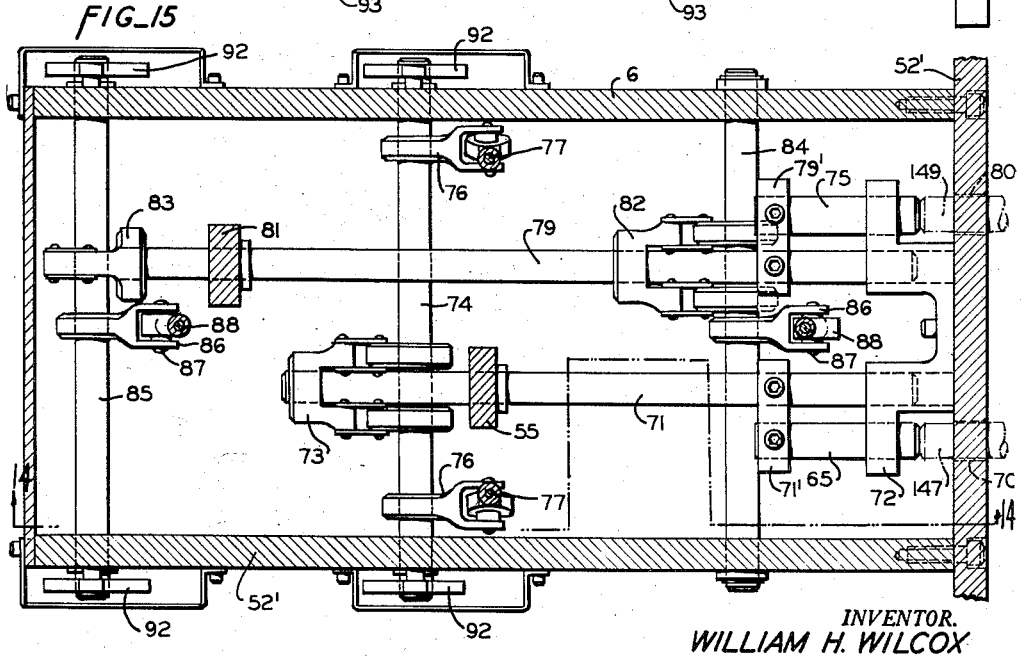
FIG_15
INVENTOR.
WILLIAM H. WILCOX
BY Fryer & Johnson
ATTORNEYS Jan. 20, 1959 W. H. WILCOX 2,869,439
CARTON SETTING UP MACHINE
Filed Dec. 9, 1954 12 Sheets-Sheet 8
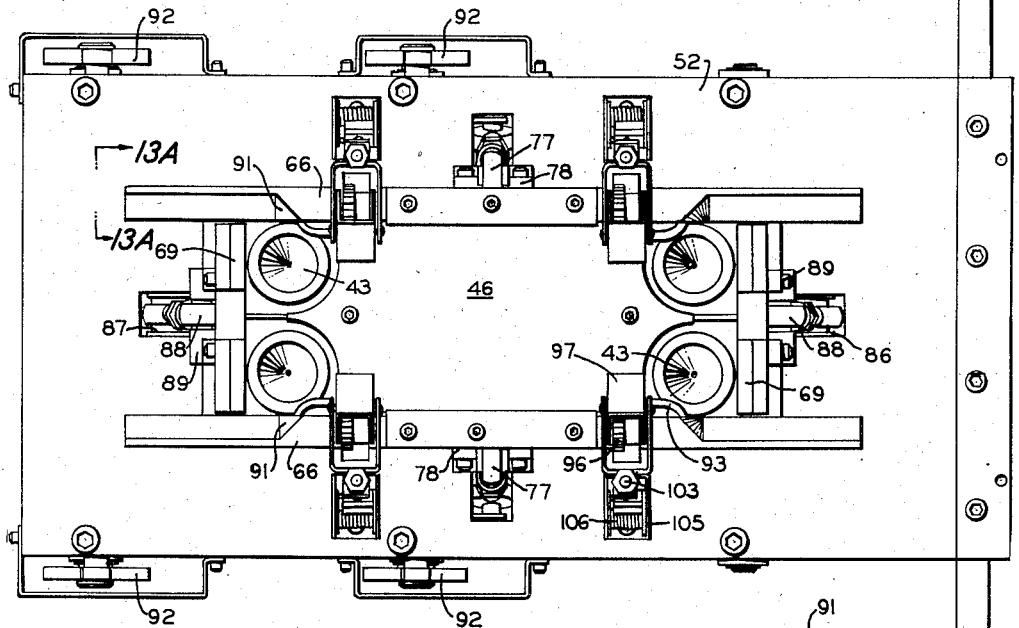
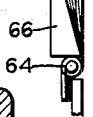
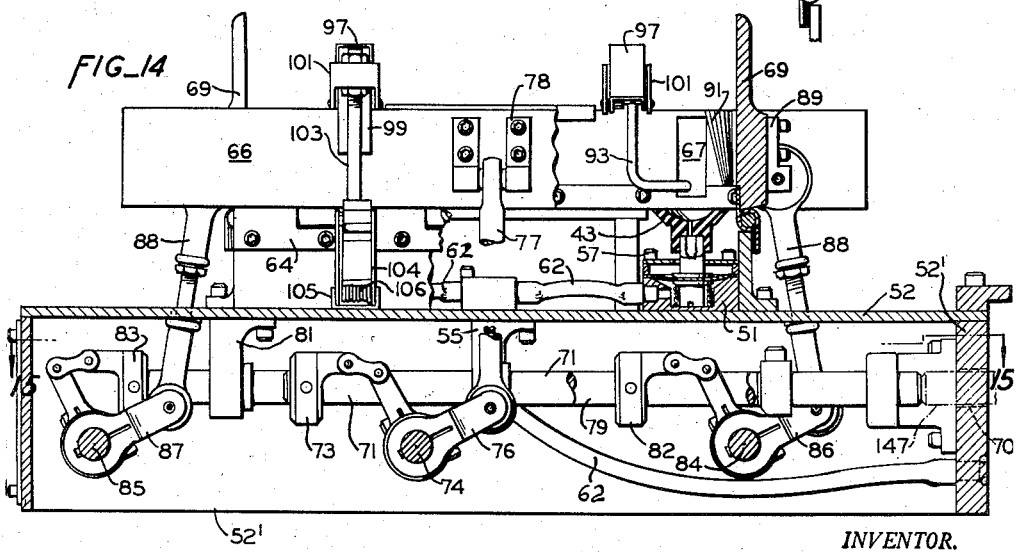
INVENTOR.
WILLIAM H. WILCOX
BY Fryer & Johnson
ATTORNEYS Jan. 20, 1959 W. H. WILCOX 2,869,439
CARTON SETTING UP MACHINE
Filed Dec. 9, 1954 12 Sheets-Sheet 9
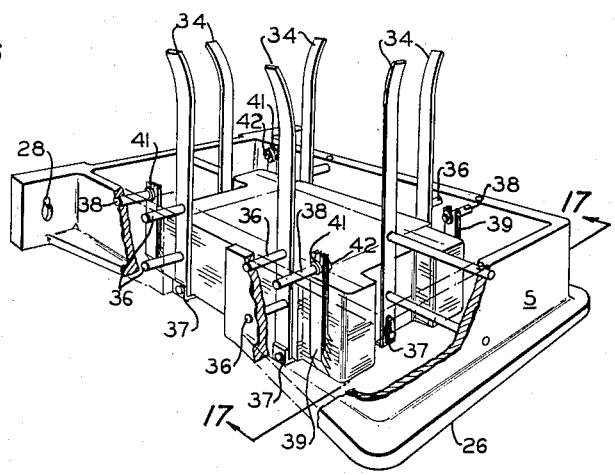
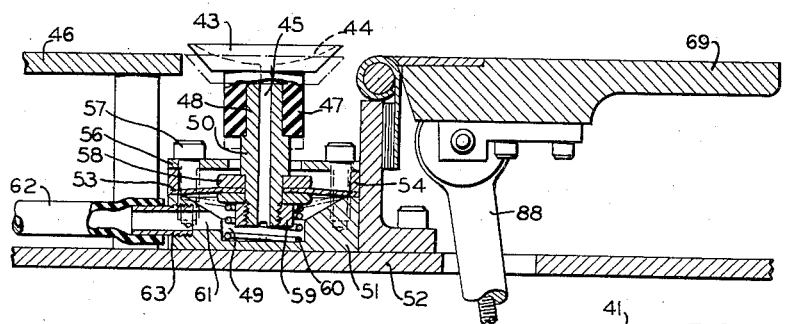
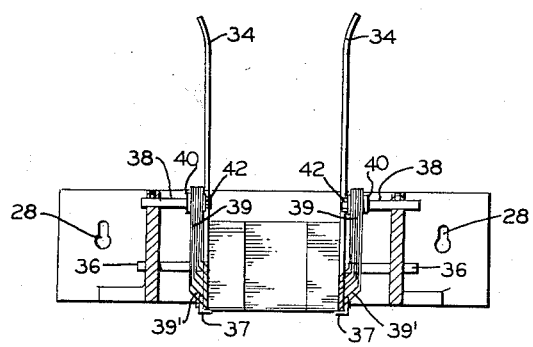
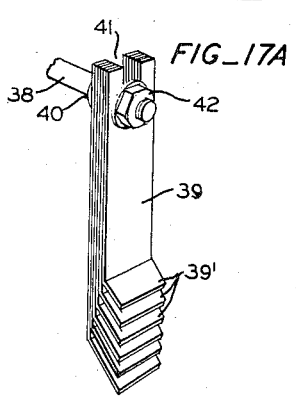
INVENTOR.
WILLIAM H. WILCOX
BY Fryer & Johnson
ATTORNEYS

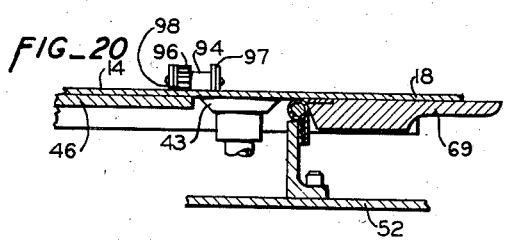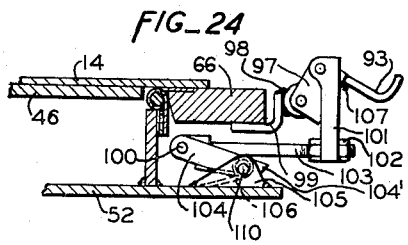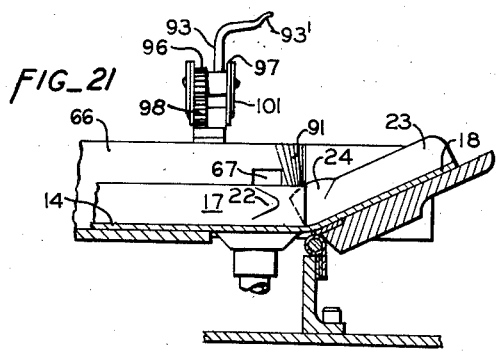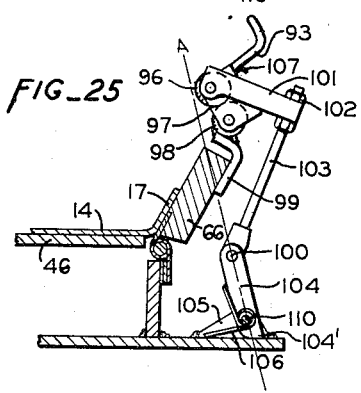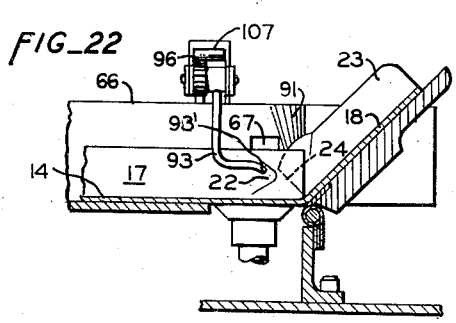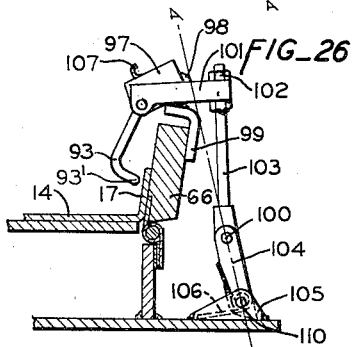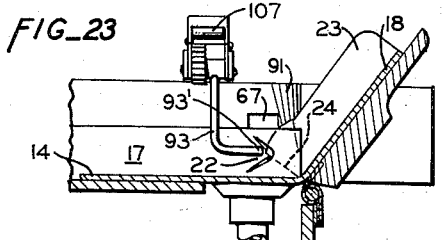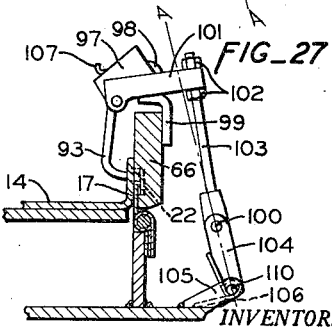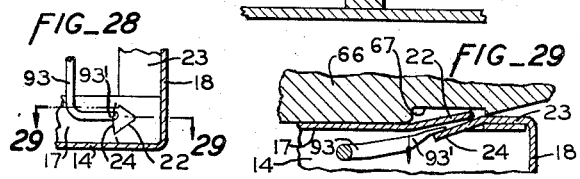

Jan. 20, 1959 W. H. WILCOX 2,869,439
CARTON SETTING UP MACHINE
Filed Dec. 9, 1954 12 Sheets-Sheet 11
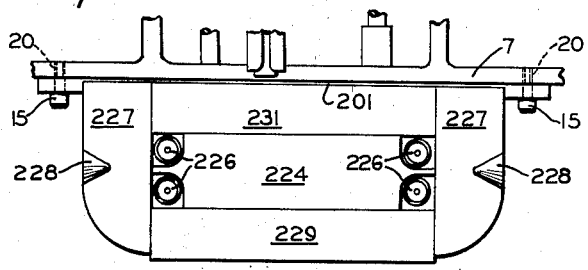
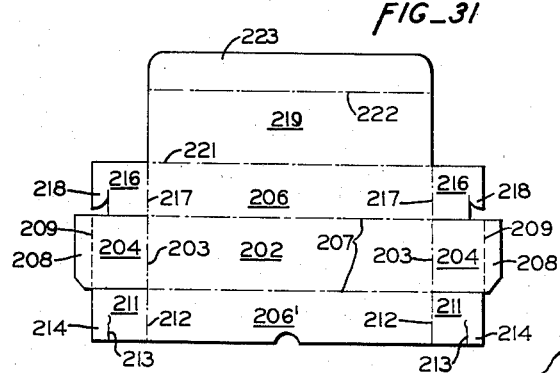
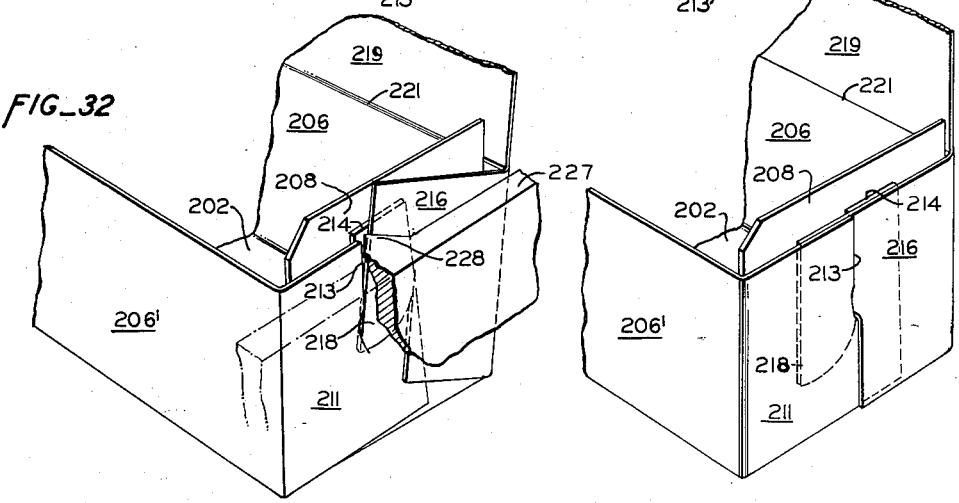
INVENTOR.
WILLIAM H. WILCOX
BY
ATTORNEYS Jan. 20, 1959 W. H. WILCOX 2,869,439
CARTON SETTING UP MACHINE
Filed Dec. 9, 1954 12 Sheets-Sheet 12

FIG_34

INVENTOR.
WILLIAM H. WILCOX
BY Fryer & Johnson
ATTORNEYS

United States Patent Office 2,869,439
Patented Jan. 20, 1959

2,869,439

CARTON SETTING UP MACHINE

William H. Wilcox, Stockton, Calif., assignor to Fibreboard Paper Products Corporation, a corporation of Delaware Application December 9, 1954, Serial No. 474,181

32 Claims. (Cl. 93—49)

This invention relates to an apparatus and method for setting up carton blanks, and more particularly to an apparatus and method for setting up the tray part of a paperboard blank adapted to provide the carton.

This application is a continuation-in-part of copending application, Serial No. 377,324, now Patent No. 2,743,-651, dated May 1, 1956.

In setting up carton blanks in the past, the equipment used has been limited for the most part to the particular shape of the blanks to be set up. When it has been desired to set up a blank of a different shape than the original, it has been necessary to use almost entirely different setting up equipment for the purpose—the change-over being costly and time consuming. Moreover, past setting up equipment has required considerable space, the carton blank stacking mechanism which provides a hopper being removed a considerable distance from the forming apparatus to allow the forming apparatus the space needed for its operation. A conveyor system has been used to connect the spaced pieces of equipment and as a result of this spacing apart and the conveying required, difficulties have arisen in maintaining a well timed operational sequence for setting up the cartons.

Further, in transferring a blank from a carton blank hopper to a forming means problems have arisen because the stack of blanks frequently become misaligned in the hopper during the operation. These problems occur for several reasons. For one, blanks within the stack frequently are warped inherently or are twisted, this warping or twisting causing the blanks positioned thereabove to be misaligned. For another, the stack itself has not been held sufficiently firm to resist misalignment from the impact it receives when placed in cooperative relationship with the carton blank transfer or pick off mechanism. Thirdly, because of this aforementioned warping or twisting of blanks, pick off of individual blanks has not been consistently uniform, the dragging and twisted portion of a defective blank not completely picked off from the stack tending to misalign the stack from which it has failed to readily separate.

The transferring or pick off of the blanks has also presented difficulties. For example, in the immediate pick off, misalignment of the stack frequently occurs, not only because a blank is twisted or warped, but also because the pick off apparatus fails to pick off a blank uniformly to obtain flat, face-to-face aligned contact of a portion of the surface of the blank with a portion of the supporting surface of the transfer member. With the surface of just one blank in such improper mating contact with the transfer member, further setting up operations have been slowed down or even stopped.

In addition, in the forming of the carton itself, particularly from a carton blank of the type having a locking tab on one end flap of one wall receivable in an opening formed by a lock forming cut in an immediately adjacent wall, difficulties have arisen because of failure to insure positive locking of the tab in the opening.

The present invention eliminates all of these aforementioned disadvantages by providing, in a method of setting up carton blanks wherein carton blanks are transferred individually from a hopper zone to a conveyor zone, the step of simultaneously setting up each of the carton blanks as it is transferred from the hopper zone to the conveyor zone.

The present invention further provides a machine for setting up carton blanks comprising hopper means to hold the blanks, former means for setting up the blanks, means for moving one of the aforementioned means relative the other, transfer means to transfer the blanks from the hopper means to the former means, ejector means to eject the formed blanks from the former means, and conveyor means to receive and convey the ejected blanks.

One of the principal features of the present invention is that it permits rapid change of carton blank shapes in setting up operations by providing a compact, interchangeable carton forming apparatus; the forming apparatus itself comprising part of a setting up apparatus which has an overall compactness, which requires comparatively little space, and which maintains an efficacious, well timed carton blank setting up operation.

The present invention further provides improved carton blank hopper and carton blank pick off features which permit proper alignment of the carton blank stack in the hopper, regardless of blank curling or twisting, and which permit a uniform, individual removal of a blank from the hopper to a transfer table.

Still another feature of the present invention is to provide a resilient floating means for holding a blank on a former member during forming operations to insure proper centering of the blank for the forming operation.

The invention also provides a carton forming member which makes for a simple, efficacious, easily observable and economical carton forming operation, including a positive locking of interengageable portions of a carton blank during setting up operations.

Various other features of the present invention will become obvious with a reading of the disclosure set forth herein.

One type of carton blank set up by the present invention is preferably of paperboard and is of a well known type which can assume various forms and in which each of one pair of opposite side walls of the blank is provided with a lock forming cut adjacent each end thereof providing a deflectable wall portion adjacent that end. A second pair of opposite side walls of the blank extends transversely with respect to the first pair of side walls. Each of such second pair of walls has a hingedly connected end tuck flap adjacent each end thereof; and each end flap is provided with a locking tab adapted to be received in an opening formed at each lock forming cut when the deflectable wall portion adjacent the cut is deflected outwardly as the carton is set up. As a result, each locking tab becomes locked in the associated lock forming opening. However, the carton forming mechanism of the apparatus can be readily interchanged to set up other carton blank styles.

Summarizing a cyclic operation of a setting up apparatus which embodies the many features of the present invention, carton blanks are introduced and aligned in a stack in a hopper positioned at the extremity of an outwardly extending first arm connected to a main frame of the setting up apparatus. A second outwardly extending arm cooperatively aligned below the first arm and pivotally connected to the main frame is swung in an upward arcuate path about its fulcrum relative to the first arm to bring a former unit which is carried on its outer extremity into alignment with the lower end of the hopper.

At this point, suction cups positioned in the bottom section of the former unit are caused to pick off uniformly an individual carton blank from the stack in the hopper. The second arm then swings in a reverse downward arcuate path toward a carton conveyor belt, the former unit carried by the arm setting up the picked off carton blank as the arm swings downwardly. By the time the second arm reaches a cooperating position with a conveyor belt, the carton blank has been set up and it is then ejected off the former unit onto the conveyor belt.

In further summarizing the blank setting up operation performed by the former unit on the style of blank previously described, as the former is moved relative to the hopper during the time the blank is set up, a first pair of opposite side members hingedly connected to a bottom portion of the former is moved upwardly to cause a first pair of opposite side walls of the carton blank to move upwardly. As these side members cause the first pair of walls to approach erected position, deflecting fingers mounted adjacent these side members are actuated to cooperate with deflectable wall portions in the side walls of the blank to form tab receiving openings in these walls when said walls reach erected position.

With the first pair of side walls in erected position, locking tabs on the end flaps of each of a second pair of opposite walls of the blank are caused to be inserted into the tab receiving openings by an upwardly moved second pair of opposite side members on the former means extending transversely of the first pair of side members. In this connection, it is to be noted that the second pair of side members is moved upwardly after said first pair of side members in a sufficient time lag to permit the deflecting fingers to first form the openings into which the tabs are inserted and interlocked. This having been accomplished, the first and second pair of side members are lowered to permit ejection of the set up carton tray, the pair of side members carrying the deflecting fingers moving in a reverse direction prior to reverse movement of the other pair of side members; the fingers being so formed that when this occurs, they pull the tabs inwardly away from the inner surfaces of the carton walls and into positive interlocking engagement in the openings to insure a securely set up carton tray.

It is to be understood that other type former units can be used in the present invention, provision being made by the present invention for quick, efficacious interchangeability of such former units.

It is to be understood further that various changes can be made by one skilled in the art in the arrangement, form, and construction of the apparatus disclosed herein and in the several steps of the method set forth without departing from the scope or spirit of the invention.

Referring to the drawings which disclose an advantageous embodiment of the present invention:

Fig. 1 is a perspective side view of the overall setting up and conveying apparatus, disclosing the compactness and ready portability of the present invention;

Fig. 2 is an enlarged side elevational view of the setting up apparatus, the side cover being removed for the purpose of clarity;

Fig. 3 is an end view of the apparatus taken on the line 3—3 of Fig. 2 with the former means omitted from the view, and disclosing the cam arrangement for the carton ejector mechanism and for the two pairs of side members of the former means;

Fig. 4 is a sectional plan view taken on the line 4—4 of Fig. 2, disclosing a portion of the frame member for carrying the former means, including the ejector mechanism, the cam arrangements for the ejector mechanism and for the side members of the former means, and the cam arrangement for actuating a control valve in the vacuum supply circuit;

Fig. 5 is an enlarged sectional view taken on the line 5—5 of Fig. 4, disclosing a side elevation of the ejector mechanism with a section of the spring arrangement for this mechanism;

Fig. 6 is a sectional view taken on the line 6—6 of Fig. 4, disclosing a side elevation of the ejector mechanism, the broken lines showing the ejector in carton ejecting position;

Fig. 7 is a plan view of Fig. 6, the ejector being in carton ejecting position;

Fig. 8 is a sectional view taken on the line 8—8 of Fig. 4, disclosing a side elevation of a cam and actuating rod associated therewith positioned below the ejector mechanism and used to actuate a first pair of side members of the former means, the broken lines representing the cam and rod position when the first pair of side members is erected or upright;

Fig. 9 is a sectional view taken on the line 9—9 of Fig. 4, disclosing a side elevation of a cam and actuating rod associated therewith for actuating a second pair of side members of the former means which run transverse to the first pair of side members and which cooperate therewith to set up a carton blank, the broken lines representing the cam and rod position when these side members are erected or upright;

Fig. 10 is a perspective view of a carton blank in its initial setting up stage and is substantially representative of the carton blank condition for the solid line cam positions disclosed in Figs. 8 and 9;

Fig. 11 is a perspective view of a carton blank as it nears the final setting up stage and is substantially representative of the carton blank condition just prior to the broken line cam positions disclosed in Figs. 8 and 9;

Fig. 12 is a plan view of the carton blank former means, the first and second pairs of side members being in a "down" or non-erected position;

Fig. 13 is another plan view of the carton blank former means, the first and second pairs of side members being in an "up" or erected position;

Fig. 13A is a side view of one side member of the former means taken on line 13A—13A of Fig. 13;

Fig. 14 is a broken elevational view taken on the line 14—14 of Fig. 15, the suction cup disclosed being under vacuum and one actuating rod being broken away to disclose another running parallel with it;

Fig. 15 is a sectional plan view taken on the line 15—15 in Fig. 14;

Fig. 16 is an overall perspective view of the carton blank hopper, partially broken away to show details more clearly;

Fig. 17 is an enlarged schematic elevational view of the hopper leaf springs, disclosing the cooperation of these springs with the carton blanks;

Fig. 17A is an enlarged view of one of the leaf springs disclosed in Fig. 17;

Fig. 18 is an enlarged view of the suction cup disclosed in Fig. 14, the side members being in down position and the cup not under vacuum;

Fig. 19 is an elevational view of the swinging frame and a part of the vacuum system carried thereby, taken in a plane indicated by the line 19—19 of Fig. 3, but illustrating in addition the manner of detachably securing the former means on the frame;

Figs. 20–23 represent four schematic sectional elevations at one end of the former means, disclosing the cooperating side members and deflecting finger in four successive stages from none-erected or "down" position to "up" or erected position.

Figs. 24–27 represent four schematic sectional elevational views of the former means and deflecting finger looking at a right angle, respectively, to the four successive stages illustrated by Figs. 20–23;

Fig. 28 represents a schematic view of a deflecting finger in cooperative relation with the deflectable portion of the carton, the end locking tab having been inserted in the recessed opening over an end portion of the deflecting finger;

Fig. 29 is a schematic plan view of the deflecting finger and carton taken on line 29—29 of Fig. 28;

Fig. 30 is a schematic plan view of another form of various types of modified former units which can replace the former unit disclosed in the previous figures;

Fig. 31 is a plan view of a carton blank which can be set up by the former unit of Fig. 30;

Fig. 32 is a perspective view of a corner of the tray of the blank disclosed in Fig. 31 just prior to tab locking engagement, one of the side members of the former unit of Fig. 30 being partially shown in broken view in cooperative relation with the blank;

Fig. 33 is a perspective view of the same corner of the tray of Fig. 32, after tab locking engagement;

Fig. 34 is a schematic view of the vacuum system.

The setting up machine is adapted for setting up well known types of cartons and trays such as are commonly used in the packaging of food products, such as bakery goods, dried fruits, and meats, and of many other items. In describing the various features of the advantageous embodiment of the machine disclosed herein, it will be seen that the disclosure is arranged to first set forth the apparatus broadly. The disclosure then sets forth in detail the particular type of carton blank to be set up, the hopper unit, the structure on the former means to pick off individual carton blanks, the former means, including the deflecting fingers, the ejector member associated with the former means, and finally, the actuating mechanism employed for effecting coordinated movement of the several units aforementioned, and the suction cup vacuum system.

General arrangement

With reference to Fig. 1 it can be seen that the overall setting up machine frame 2 is mounted on casters 3 and can thus be moved about a plant as needed. The machine itself is compact and can be arranged for convenient operation from either side.

Attached to an adjustable frame arm 4, adjustable through screw down means 10 at the top portion of the machine frame 2, is a hopper unit 5, details of which will be hereinafter described. Former means 6, which also will be described in detail hereinafter is removably attached to a swinging frame member 7 with an end of the former unit abutting an end of the frame 7 in face to face relationship, the other end of frame 7 being pivotally attached to frame member 2. Thus, the former means 6 is adapted to swing upwardly through an arcuate path into cooperative relationship with the lower end of hopper unit 5 to pick off carton blanks individually for setting up. With reference to Fig. 1, it can be seen that one type of former means can be swiftly removed merely by unfastening securing means 15 from swinging frame member 7 and replaced with another type former means in accordance with the carton blank types to be set up.

The swinging frame member 7 which comprises the supporting structure has an abutment face with threaded holes 20 disposed therein providing for detachable support of former unit 6 by means of cap screws 15 (Fig. 19). As will be seen hereinafter, the actuating mechanism in frame 7 for the former unit 6 terminates adjacent the abutment face whereby setting up devices for different blanks can be quickly interchanged.

Pivotally attached at one end to the setting up machine frame 2 below the former means 6 is an endless delivery conveyor 8, supported on the forked support leg 9 and powered by the power unit 11. A deflecting plate 12 is positioned immediately below the former means 6 to deflect the set up cartons ejected from the former means 6 onto the endless conveyor 8 when the former means is swung downwardly, the former means setting up each of the individually picked off carton blanks as it passes through its downward path. It is to be understood that various type endless conveyors can be used to deliver the set up cartons for further processing, the size and speed of conveyor operation varying in accordance with other parts of the machine and the results desired.

Description of carton

As previously mentioned, the carton blanks to be set up by the present invention can assume various forms well known in the art. Figs. 10 and 11 depict for purposes of illustration one particular type of carton blank construction embodying the features adapted for setting up in the type of machine to which this invention relates. The blank of Fig. 10 is preferably of paperboard, but can be of any other suitable type of material, and is suitably scored to provide a bottom panel 14 for the tray part of the carton. Hingedly connected to bottom panel 14 along score lines 16 is a first pair of opposite side walls 17; and another or second pair of opposite side walls 18 extending transversely with respect to side walls 17, is hingedly connected to bottom panel 14 along score lines 19.

Each wall of the pair of side walls 17 is provided adjacent each end thereof with a V-shaped cut in the form of a slit 21 to provide an outwardly deflectable wall portion 22 which, when deflected outwardly in a manner to be subsequently described, provides a lock forming opening at such cut 21 adapted to receive in locking engagement a tuck flap 23 on the carton. Each flap 23 is formed as an end flap hingedly connected by a continuation of a score line 16, to an end of each of side walls 18; and each end of flap 23 is cut to provide a locking tab 24 which is the part that actually engages in the associated lock forming opening at a cut 21 when the tab is inserted into such opening. In this connection, it is to be understood that in effecting setting up of the tray part of the carton, each of the pair of side walls 17 is turned upwardly along a score line 16, each of the pair of side walls 18 is turned upwardly along a score line 19, and each of the end or tuck flaps 23 is turned or bent inwardly along a score line 16 towards the outside faces of side walls 17.

When the locking is effected in the described position of the parts, the outwardly deflectable wall portions 22 are deflected to receive the locking tabs 24 in the resultant openings. When the pressure on the parts is released, the natural resiliency of the material causes all the walls 17 and 18 to spring outwardly, resulting in the locking of locking tabs 24 in the openings adjacent cuts 21. This principle of locking the tray part of the carton is well known; and it is to be understood that the particular structure can vary widely, as it is only necessary to have the outwardly deflectable portions 22 which can receive the locking tabs 24 in the openings formed.

In order to insure a proper positive locking of the tab 24 in the formed opening, the present invention further provides an arrangement whereby, once the tabs 24 have been inserted into the openings, the tabs are subsequently pulled inwardly away from the inner surfaces of the side walls 17 to cause them to engage positively with their openings. An advantageous embodiment of the structure used to accomplish such positive locking of the tabs will be seen in the disclosure set forth hereinafter.

Although a carton is disclosed with only a tray part to be set up, it is to be understood that the machine can also set up carton blanks which have a cover panel hingedly connected to a side wall of the tray (Figs. 30-33).

Hopper

Referring to Figs. 1, 2, 16 and 17, the hopper unit 5 comprises a hollow rectangular frame 26 having a carton blank inlet and outlet side disposed therein; this frame also having one end connected to the free end of the hopper arm frame 4, by means of bolts 27 passing through bolt holes 28 at one end of the frame (Fig. 16). Thus, through this connection different hoppers can be interchanged quickly to conform with the particular carton blank to be set up by a particular former unit. The hopper arm frame 4 on one end of which the hopper 5 is supported has its opposite end pivotally journalled on main shaft supporting bolts 29 (Fig. 3) which project through the sides of the setting up machine frame member 2, washers 31 being interposed between the outer sides of the frame member and the inner sides of the bolt heads. Bolts 29 are each hollowed at their inner ends to support main shaft 32, the function of which will be described hereinafter. Main shaft 32 is firmly held in place by clamping collars 33 cooperating with the extremities of the bolts 29 and also holding the ends of the hopper arm 4 mounted on these bolts in proper position. By means of screw down mechanism 10, extending through frame 2 and connected to arm 4 (Figs. 1 and 2), the arm 4 can be pivotally adjusted about the main shaft supporting bolts 29 and thus the hopper unit 5 can be set in a selected position.

As can be seen in Fig. 16, frame 26 of the hopper has carton blank guide members 34 disposed therein and fixed to the walls of the frame by pins 36. Each of these guide members 34 has an inwardly projecting right angle member 37 adjustably positioned at its lower extremity, the members 37 thus supporting a stack of carton blanks inserted through the top inlet side of the frame 26 between the guide members 34.

Also attached to the walls of frame 26 adjacent guides 34 by means of pins 38 are additional blank orientating means in the form of cooperably opposed L-shaped thin resilient overlapping leaf springs 39. These springs are desirably of about 0.018" thick spring steel for all inside springs and the outside spring is about 0.025" thick for protective purposes, the springs having inturned ends 39' which slant downwardly toward the pick off end of the stack. Each of these leaf springs runs substantially parallel to a side of the carton stack and the upper extremity of each of the leaf springs is provided with a slot 41 (Fig. 17A) to permit limited vertical adjustment of the leaf spring relative to its supporting pin 38, between shoulder 40 of the pin and fastening nut 42 threaded on the extremity of the pin.

Thus, by setting all of the leaf springs so as to have their lower inturned fingers 39' engage resiliently the sides of the lower extremity of a stack of carton blanks introduced into the hopper unit 5, it is possible to hold and align the blanks on the outlet side of the hopper for setting up operations. In this connection, the springs are fixedly held at their upper ends at 38 and their lower ends are free. As a result, their slanting fingers 39' resiliently and yieldably engage opposite side edges of the blanks in the stack because of the inherent flexibility of the springs. Thus, the spring fingers 39' provide a continuous centering means for the individual blanks in the stack to maintain them all in alignment, which is important in case one or more of the blanks should have a tendency to curl or twist. Also, because of the yieldable engagement of the slanting fingers 39' with the blanks, the entire stack of blanks can fall down by gravity, due to the weight of the stack, past the ends 39', so as to have always a bottom blank supported by angle members 37 for pick off from the stack. Further, since fingers 39' slant toward the pick off end of the stack or in other words the hopper bottom opening, they serve as a stop means to prevent reverse movement of the blanks when the pick off mechanism contacts the lower blank for pick off to thus insure pick off without misses.

Since the springs are free at their lower ends 39' which are inturned toward the hopper bottom opening, each successively lower spring is free to flex outwardly independently of the springs therebefore. Consequently, any outward flexing of lower springs upon removal of a blank through the bottom opening of the hopper will not affect any spring above from serving either to hold blanks in alignment or as a stop to prevent reverse movement of blanks. Also, inward flexing of upper springs by blanks which may tend to move reversely will not affect any springs therebelow.

*Blank pick off*

Referring to Figs. 1, 12, 13, 14 and 18, it will be noted that former means 6 is provided with vacuum means to transfer blanks individually from the hopper unit 5 to the former means. This vacuum means comprises soft flexible suction cups 43, preferably of rubber (Figs. 13, 14 and 18) having passages 45 therein, the cups being positioned at each of the corners of the base portion or bottom member 46 of former means 6. As can be seen in Fig. 18, each of cups 43 has a dished out or concave base portion 44 and is floatingly and resiliently mounted so that the rim of portion 44 of the cup normally projects above the upper face of the bottom member 46 of former means 6.

A stem portion 47 of each of the cups projects downwardly into the base of the former means 6. The stem 47 is attached to a hollow conduit 48 which projects into a vacuum chamber 49 formed by a dished out ring disc 51, the passage 45 of cup 43 thus communicating with this chamber 49; chamber 49 being sealed off by a flexible diaphragm 53 of suitable material, such as rubber, which also provides a limited universal or floating support for suction cup 43. The disc 51 in turn is fixed to base plate 52 forming the cover of a housing for self-contained actuating mechanism of the former means described more fully hereinafter, said housing having side walls 52'. Diaphragm 53 is held in place at its outer periphery by clamping ring 54, end plate 56 and bolts 57. It will be noted that the diaphragm is of greater diameter than the distance between securing points 57, so that it is normally bowed, to thus provide a limited degree of lateral movement for the suction cup, as well as up and down movement.

Centrally disposed openings are provided in end plate 56 and diaphragm 53 to permit the stem 48 to project therethrough and into chamber 49. To prevent leakage of chamber 49 to atmosphere, a pair of clamping and sealing rings 58 is positioned at each side of diaphragm 53, being clamped in position by a securing nut 59 which thrusts the rings against a shoulder 50 of stem 48 to thus also cause the stem 48 to be freely supported by the flexible diaphragm 53. Loosely surrounding nut 59 is a helical spring 60 bearing against the lower clamping ring 58 to cause rim portion 44 of the suction cup attached thereto by stem 47 to project normally and resiliently above the upper face of bottom member 46.

When the former means 6, carrying suction cups 43, is swung into cooperative relationship with the lower end of hopper unit 5, uniform registration of all the suction cups with the bottom panel 14 of the lowermost blank is thus insured because of the limited universal mount which diaphragm 53 provides. This is so even though a lowermost blank might be slightly curled or twisted, the floating and resiliently mounted cups 43 contacting the lower portions of the blank first and giving way resiliently toward the base of the former unit to permit the advance of other cups to contact other higher portions of the blank. It is to be noted that as the former means 6 is swung into cooperative relationship with the lower end of hopper unit 5, a vacuum is applied to the chambers 49 through an inlet 61 in the chamber. This vacuum is controlled by a system hereinafter described and is connected to inlet 61 of each chamber 49 through conduit system 62 and nipple 63.

When all of the suction cups 43 are in registration with bottom panel 14 of the blank, the vacuum circuit is closed and cups 43 seal against the bottom panel or sheet 14. This causes a suction on diaphragm 53 and the suction on the diaphragm moves the diaphragm and each of the resiliently mounted suction cups downwardly against its spring 60 and thus, the bottom panel 14 of the lowermost carton blank in hopper unit 5 is brought into flat registration with the upper face of the bottom member 46, the former unit 6 swinging downwardly at the same time to pick off this lowermost blank to be set up by the former unit.

Former means

The former unit, as can be seen more clearly in Figs. 12–15 and Figs. 20–29, comprises the aforedescribed bottom member 46, which is adapted to register with the bottom panel 14 of a carton blank as aforedescribed. As also described, bottom member 46 has a floating suction cup 43 disposed in an opening at each of its corners to pick off and hold the bottom panel 14 of the blank in face-to-face contact with the bottom member. In this connection, it is to be noted that since suction cups 43, which hold bottom panel 14 of a blank in flat registration with the bottom member 46 of the former unit, are floatingly and resiliently mounted, any misalignment of bottom panel 14 with bottom member 46 is automatically corrected. This is so since the floating feature of cups 43 permits the bottom panel 14 held by the cups to shift laterally by virtue of the limited lateral movement provided by diaphragm 53, into proper alignment with member 46 with the raising of the following described pairs of side members of the former unit 6.

Hingedly connected to bottom member 46 by hinges 64 is a first pair of opposite side members 66. Each of these side members 66 is cooperable with the first pair of side walls 17 of the carton blank to move these walls into an erected position. Also, they simultaneously move tuck flaps 23 into erected position with walls 17. Further, each has accommodating or recessed portions 67 disposed therein at each end to accommodate the deflectable wall portions 22 of the first pair of carton walls 17 when said wall portions are deflected during setting up or erection operations of the carton blank. The deflection of these portions 22, which will be described in detail hereinafter, provides tab receiving openings in each of walls 17 of the carton for the carton locking tabs 24.

Also, hingedly connected to the bottom member 46 by hinges 68, extending transversely with respect to side members 66 is a second pair of side members 69. These side members 69 are cooperable with the second pair of side walls 18 of the carton blank to move walls 18 to an erected position and to further bend tuck flaps 23, previously erected by side members 66, inwardly in timed cooperation with side members 66 so that the tuck flaps overlap the ends of the outer faces of walls 17, the locking tabs 24 engaging in the tab receiving openings as the walls 18 reach erected position.

In order that side member pairs 66 and 69 can erect or set up wall pairs 17 and 18, means in the form of a self contained mechanism in former unit 6 is provided to pivot the members 68 and 69 upwardly about their hinges. Referring to Figs. 14 and 15, an actuating rod 71 for the pair of side members 66 is supported for slidable movement below plate 52 by a multiple rod support and guide bracket 72 fixed to one end of unit 6 and is further supported for slidable movement by a single rod support and guide bracket 55 fixed to the bottom plate 52 intermediate the ends of unit 6. Running parallel to one end of rod 71 and fixed thereto near one extremity by link clamp 71' is a short actuating rod 65. The rod 65 is slidably mounted in multiple guide bracket 72 and in line with hole 70 in the side wall of the former unit, to thus expose the rod 65 for actuation at the outer face of such side wall of the unit, this outer face abutting against the end face of swinging frame 7. Attached to the other extremity of actuating rod 71 is a bifurcated rocker bracket assembly 73. The two arms of rocker bracket assembly 73 are fixed in turn to a shaft 74 which is oscillatably journaled in the unit 6 to extend across the width thereof below plate 52. Fixed at either end of shaft 74 are the bifurcated crank arms 76 and pivotally connected to each of these arms is an end of a vertical actuating arm 77. Each of the vertical actuating arms 77 extends through an opening in plate 52 provided therefor and is pivotally connected at its other end to a bracket 78 (Fig. 14) fixed to the outer face of side member 66. Thus, it can be seen with particular reference to Figs. 14 and 15 that when actuating rod 71 is caused to slide inwardly from right to left by movement of rod 65 to which it is attached, rocker bracket 73 causes the transverse shaft 74 to rock in a counterclockwise direction and to move the bifurcated crank arms 76 fixedly attached thereto upwardly. In turn, this causes the vertical actuating arms 77 to move upwardly and to thus move the side members 66 upwardly to an erected or carton setting up position.

The side members 69 are also caused to be erected in substantially the same manner. Again referring to Figs. 14 and 15, an actuating rod 79 for the pair of side members 69 is supported for slidable movement below plate 52 at one end of the former unit by the aforedescribed multiple rod support and guide bracket 72 and is further supported for slidable movement by single rod support and guide bracket 81 fixed to the bottom plate 52 of unit 6 near the end opposite bracket 72. Running parallel to one end of rod 79 and fixed thereto near one extremity by another link clamp 79' is a short actuating rod 75. The rod 75 is also slidably mounted in multiple guide bracket 72 and is in line with hole 80 in the side wall of the former unit to thus expose the rod 75 for actuation at the outer face of the same side wall at which rod 65 is exposed for actuation. Also attached to rod 79 near this same extremity is bifurcated rocker bracket assembly 82 and attached to the other extremity of rod 79 is a single rocker bracket assembly 83. The two arms of rocker bracket assembly 82 are fixed in turn to a shaft 84, which shaft is oscillatably journaled at one end of the unit 6 to extend across the width thereof below plate 52, and the arm of rocker bracket assembly 83 is fixed in turn to a shaft 85 which is oscillatably journalled at the opposite end of unit 6 to extend across the width thereof below plate 52 in like fashion as shaft 84.

Fixed to shafts 84 and 85 respectively are the bifurcated crank arms 86 and 87, and pivotally connected to each of these arms is one end of a vertical actuating arm 88 (Fig. 14). Each of these vertical actuating arms 88 extends through an opening in plate 52 provided therefor and is pivotally connected at its other end to a bracket 89 fixed to the outer face of side member 69. Thus, it can be seen with particular reference again to Figs. 14 and 15 that when actuating rod 79 is caused to slide inwardly from right to left by movement of rod 75 to which it is attached, rocker brackets 82 and 83 attached to rod 79 cause the transverse shafts 84 and 85 to rock in a counterclockwise direction and to move their respective bifurcated crank arms 86 and 87 fixedly attached thereto upwardly. In turn, this causes the vertical actuating arms 88 to move upwardly and to thus move the side members 69 upwardly to an erected carton setting up position.

A cam actuating means described hereinafter causes the actuating rods 71 and 79 to be moved sequentially inward through movement of short rods 65 and 75 to cause side members 66 to move carton walls 17 upwardly first and walls 17 to reach their erected position prior to the full erection of walls 18 by side members 69. This sequence of carton setting up is staggered in such a manner to insure that the tuck flaps 23 of carton walls 18 overlap the ends of the outer face of walls 17 so that the locking tabs 24 engage in the tab receiving openings shortly after formation of the openings and as the walls 18 reach erected position. In this connection, each of the side members 66 has its end portions swept back or recessed as at 91 to accommodate tuck flaps 23 during setting up operations so that when side members 66 are moved upwardly, the natural resiliency of the material will cause the tuck flaps 23 to be in a plane in back of side walls 17. Hence, when the flaps 23 are moved inwardly by side members 69, which side members are positioned between the recessed portions 91 of members 66, the flaps 23 will sweep along the outside faces of walls 17 in position for the locking tabs to be inserted along the inside faces of deflectable wall portions 22.

As also will be seen more clearly hereinafter, it is desirable that the side members 66 and 69 return downwardly to flat position after the carton is erected. To accomplish this, each end of shafts 74 and 85 is provided with a return spring 92 and each spring is also attached to the body of former unit 6 (Fig. 2). Accordingly, when rods 71 and 79 are actuated from right to left to turn shafts 74 and 85 respectively counterclockwise, the springs 92 are loaded. When the actuating force is removed, the springs 92 cause shafts 74 and 85 to rotate in the opposite direction and thus cause the side members to move downward to return to their original flat position. It is to be understood that the present invention is not to be limited to this spring loaded device and various other return devices can be used if so desired.

In order to deflect the deflectable wall portions 22 of carton walls 17 into the accommodating or recessed portions 67 provided near each end of the side members 66, each of these side members is provided with a pair of deflecting fingers 93 (Fig. 12). Each of these fingers 93 is desirably hook shaped because, as will be noted from Figs. 24 through 29, the deflection end 93' of each finger is displaced relative to the plane of the stem of the finger. This facilitates moving the fingers without interference over the top edges of side members 66; and for this purpose, the fingers are pivotally mounted so as to have their free ends 93' move over and across the top edge of side member 66 and move in a substantially normal direction into cooperating relationship adjacent and opposite the accommodating portions 67 of the side member as the side member is erected. Thus, the deflectable portions 22 of side walls 17 erected by members 66 are deflected by fingers 93 into accommodating portions 67. Also, it will be noted that the end portion 93' of each deflecting finger projects laterally in a general horizontal direction and points toward the end of wall 17 to provide a pull in hook for tab 24, as is explained more fully hereinafter.

Referring to Figs. 20-29, an advantageous mounting apparatus for pivotally mounting each of the deflecting fingers 93 is shown. It is to be understood that the present invention is not limited to the particular mounting apparatus disclosed and other type mountings can be used. In the present embodiment, each of the deflecting fingers 93 is mounted on a sleeve 94 which has a first spur gear 96 integral therewith. The sleeve 94 is oscillatably mounted in one end of a bracket 97. The other end of bracket 97 pivotally straddles a second spur gear 98, the gear 96 being in meshing engagement with gear 98. This gear 98 is arranged to sit in fixed position along the top edge of the side member 66, being attached to one leg of right angle member 99, the other leg of which is fixed to the outer face of side member 66. In effect, gear 98 acts as a fixed sun gear about which gear 96 turns like a planetary gear when bracket 97 is caused to pivot, the free end 93' of finger 93 integral with gear 96 moving across the top of member 66 and into cooperative relationship with accommodating portion 67.

The pivotal movement of bracket 97 about gear 98 to cause finger 93 to cooperate with accommodating portion 67 is effected through a yoke 101, the arms of the yoke being pivotally connected to the bracket 97 at that end of the bracket which supports the spur gear 96. Adjustably attached to the other end of yoke 101 through adjustable nut assembly 102 is a downwardly extending link 103 which in turn is pivotally attached at pivot axis 100 to one end of arm 104. The other end of arm 104 is pivotally mounted about pivot axis 110 in a bracket 105 fixed to plate 52 of the former unit. Referring to Figs. 24-27, arm 104 is spring urged in a clockwise direction to erected position by a working or so-called rat trap spring 106 attached thereto, the arm 104 being limited in its clockwise movement by having one of its extremities 104' arranged to abut the housing plate 52, and thus provide a stop.

In operation, timed actuating mechanism, described in detail later, moves side members 66 and 69 in proper sequence. When the side member 66 is moved upwardly toward carton setting up position, the spring 106 urges the arm 104 to pivot clockwise about axis 110 until it reaches its erected position as determined when stop 104' limits motion of arm 104, thus establishing an "over-center" line indicated by broken line A—A, which line passes between pivot axes 100 and 110. It is to be noted that arm 104 reaches its erected position prior to side member 66 reaching its erected position, and it is to be further noted that, until the "over-center" line A—A is established, the spur gear 96, finger 93 integral therewith and bracket 97 remain fixed relative to spur gear 98. Once the line A—A is established, continued upward movement of side member 66 causes the pivot axis of gear 96 to pass in a counter clockwise direction across established line A—A. Also when line A—A is established, link 103 continues to pivot counter clockwise about axis 100. This causes bracket 97 and gear 96 to pivot counter clockwise about the axis of fixed spur gear 98, the gear 96 meshing with gear 98. Since deflecting finger 93 is integral with gear 96, the deflecting finger is moved into cooperative relationship with recessed portion 67 to depress the deflectable portion 22 of the carton wall 17 into the recessed portion and create a tab receiving opening substantially at the time side member 66 reaches its fully erected position.

During the period of erecting carton walls 17 and forming the tab receiving openings therein by deflecting action of each of fingers 93, the side walls 18, transverse to walls 17, are caused to move upwardly by swinging the side members 69 upwardly shortly after members 66 are started in their upward direction. As this is done, the tuck flaps 23 are moved inwardly together with walls 18 to pass over and along the outside face of the ends of walls 17, the locking tabs 24 attached to the flaps 23 coming into engagement with the recessed openings formed by the deflecting fingers 93 just after the openings are made.

Referring particulary to Figs. 28 and 29, it can be seen that each locking tab 24 becomes positioned over the end 93' of deflecting finger 93, the tab passing over this portion of the finger as it enters the tab receiving opening formed by the depressed portion 22. Accordingly, when the side members 66 are swung in a reverse or clockwise direction to a flat down position after the carton walls are erected, through the action of the aforedescribed springs 92 against the actuating mechanism for members 66 and 99 to be described, fingers 93 attached to these side members 66 are caused to move clockwise with these side members, the lateral projecting ends 93' of the fingers situated between deflectable portions 22 and locking tab portions 24 of the carton moving away from portions 22 against and past locking tabs 24 to pull the tabs 24 into positive engagement with their tab receiving openings. In this connection, because the mounting linkage for each finger 93 is such that the axis of gear 96 passes across "over-center" line A—A, the locations of the pivots in the linkage provide sufficient rigidity at the time the finger pulls out locking tab 24 or deflects deflectable portion 22.

This being the final stage of the setting up of the carton tray, the side members 66 continue their downward swinging motion, caused by springs 92, to flat position, reaching it as the former unit 6 swings into cooperative relation with delivery conveyor (Figs. 1 and 2). It is to be noted that as side members 66 move in a reverse direction, side members 69 remain erect until fingers 93 have passed locking tabs 24 and positive engagement of the tabs is effected. Once this occurs, side members 69 are also moved in a reverse direction by their springs 92. It also is to be noted that as the side members 66 and deflecting fingers 93 move in the reverse direction, each of the deflecting fingers 93 and gears 96 are limited in reverse pivotal movement by a stop member 107 fixed to the bracket 97 and against which the stem of finger 93 is adapted to abut when finger 93 is moved clockwise a certain distance. Also, when each finger 93 engages a stop 107 on bracket 97, relative movement between the bracket and the finger is precluded in a clockwise direction.

When finger 93 abuts against stop 107, clockwise pivot motion of finger 93, gear 96 and bracket 97 ceases, and link 103 is caused to thrust against one end of arm 104 as side member 66 continues its downward movement through the force exerted by springs 92. As a result of this, arm 104 pivots counter-clockwise about its mounting in bracket 105 against spring 106 in smooth pivoting operation, thus loading spring 106 for the next setting up operation. In this connection, it is to be noted that the downward thrust created by springs 92 to urge the side members 66 to down flat positions is greater than the upward thrust created by springs 106 against arms 104 in order to permit such a loading of springs 106. Stop member 107 is arranged to provide maximum lay back of deflecting finger 93 and to keep the finger 93 in proper relationship with "over-center" line A—A.

*Ejector means*

By the time the side members 66 and 69 are in flat down position the former unit 6 has been brought into cooperative relationship with conveyor 8 and the ejector arm 108 (Figs. 4 and 5) is caused to sweep over the top surface of the former unit and push off the set up carton tray onto the conveyor.

As can be seen in Figs. 2, 4 and 5, the ejector arm 108 is carried on the upper part of swinging frame 7, one end of frame 7 supporting the former unit 6 for its swinging motion into relationship with the lower end of hopper unit 5 to pick off a carton blank. To permit swinging motion of frame 7, the end of frame 7 opposite the end supporting former unit 6 is pivotally journaled onto the main support shaft 32 by means of the bearing members 109 integral with the frame (Fig. 3). As described above, shaft 32 extends transversely across main frame 2, being fixedly supported thereon by support bolts 29. Actuating mechanism to be described hereinafter is associated with the frame 7 to swing the frame up and down about shaft 32, to actuate the side members 66 and 69 of the former unit 6 removably attached to the frame, and to actuate the ejector arm 108 mounted on the frame, all in selected coordination with the swinging of the frame. It will be noted herein that the actuating mechanism for the former unit associated with frame 7 extends to the former unit support end of frame 7 to permit quick interchange of former units onto the frame 7.

The ejector arm 108, as can be seen in Figs. 4 through 8, is slidably mounted on two pairs of gib rails 111 which in turn are mounted on a flat supporting beam 112. It is to be noted that beam 112 is fixed to the top side of frame member 7 above part of the actuating mechanism for the side members 66 described hereinafter. Attached to the top surface of ejector rod 108 at its ejecting end is an adjustably mounted ejection member 110 having a slot 110' through which guide posts 113 on arm 108 extend, the member 110 being adjustable lengthwise to fix the effective length of rod 108 in accordance with the type of cartons being handled. Members 108 and 110 are fixedly held in adjusted position by suitable nuts on post 113. A guide post 114 is attached to the top surface of ejector 108 toward its trailing end. The guide post 114 is engaged in a slot 116 (Fig. 4) positioned at one end of ejector actuating arm 117. The other end of the ejector actuating arm 117 is fixed to a pin 118 (Fig. 5). Pin 118, in turn, is pivotally mounted in bearings 119 which are set in vertically spaced alignment in frame 7. Surrounding the pin 118 is a helical spring 121, one end of which is connected to the pin and the opposite end to the upper bearing 119. Thus, when actuating arm 117 is pivoted counterclockwise (Fig. 4), causing ejector arm 108 to eject a carton, the spring 121 is loaded. When the actuating force for ejection is released, the ejector arm is then returned to initial non-operative position by this spring.

In order to pivot arm 117 with pin 118, the arm 117 is connected by a vertical arm 122 to an actuating rod 123, the upper end of arm 122 having a pin 124 projecting into a slot 126 in arm 117 and the lower end being held fast to rod 123 by means of a bifurcation and set screw arrangement 127.

*Actuating mechanism*

Any suitable actuating mechanism can be employed for effecting coordinated movement of actuating rod 65 connected to side members 66 of the former unit, actuating rod 75 connected to side members 69 of the former unit 6, actuating rod 123 connected to ejector 108, the swinging of frame 7 carrying the former unit 6, and the application of a vacuum to suction cups 43. An advantageous form of such mechanism is illustrated more clearly in Figs. 2, 3, 4, 9 and 19 and will now be described.

As previously mentioned the actuating mechanism is associated with the swinging frame 7, which frame has been described as being supported by the main shaft 32, it being again noted that the actuating mechanism for the former unit is so arranged as to permit quick interchange of former units onto the frame 7. In addition to frame 7, shaft 32 also supports a sleeve 128 (Fig. 3) rotatably mounted on the shaft between bearing members 109 of the frame. Spacing collars 129 fixed to shaft 32, set the sleeve 128 for proper horizontal alignment on the shaft 32 and space it from bearing members 109. Since bearing members 109 are integral with frame 7 and straddle the fixed collars 129, frame 7 is also set for proper horizontal alignment on the shaft.

In order to rotate sleeve 128 on the shaft, the sleeve is provided with a sprocket 131 fixed thereto, this sprocket being rotated by chain 132 connected to the sprocket and to suitable reduction gearing in gear box 133, in turn connected to belt drive 133' driven from a motor (not shown) mounted on frame 2. A sprocket 134 transmits the drive from gear box 133 to chain 132. An adjustable idler sprocket assembly 136 is provided to cooperate with drive chain 132 to maintain it taut.

Fixed to sleeve 128, in addition to sprocket 131, are three cams 137, 138, 139, the cams abutting the shoulders 141, 142 and 143, respectively, these shoulders being integral with sleeve 128. When sleeve 128 is rotated, cam 137 is caused to actuate the ejector arm 108 through a cam follower 144 fixed to the aforedescribed actuating arm 123 (Fig. 6). In the same manner, cam 138 is caused to actuate rod 65 and its associated side members 66 through cam follower 146 fixed to rod 147 (Fig. 8) and cam 139 is caused to actuate rod 75 and its associated side members 69 through cam follower 148 fixed to rod 149 (Fig. 9). In this connection, it to be noted that rods 123, 147 and 149 are slidably mounted in frame 7, the rods 147 and 149 being so aligned with holes 70 and 80 respectively in the former unit as to cooperate with the actuating rods 65 and 75 on the former unit which unit is removably connected to frame 7 by bolts 15 in such a manner as to permit quick interchange. It is to be further noted that the frame 7 is provided with guide means 151 to accommodate an additional actuating rod if so desired. Such an additional rod and an associated cam on sleeve 128 would be necessary for a certain type former unit which could be removably connected to the frame 7 in place of the disclosed former unit 6 in order to set up a modified type carton blank hereinafter described (Figs. 30–33).

In order to keep the cam followers 144, 146 and 148 properly engaged with the cams 137, 138 and 139, respectively, spring means are provided to resiliently urge each of the followers against their respective cams. Referring to Figs. 4 and 6, each of these spring means comprises a hollow cylindrical tube 152 fixed to frame 7 opposite the follower with which it cooperates and above the actuating rod to which the follower is attached. Inserted within the tube is a spring 153 (Fig. 4), the spring urging against the end of a stem assembly 154 slidably disposed in the tube and connected to the oppositely disposed cam follower. Thus, the springs insure that each of the respective followers follows the contour of its associated cam as the cam is rotated with sleeve 128.

As can be seen in Fig. 2, the cams 137, 138 and 139 are fixed in different positions on sleeve 128 relative to each other and have different shapes in order to provide a selected sequence of operations. In the advantageous embodiment of the invention disclosed, the cams are so shaped and positioned (Fig. 2) that as the cams are rotated clockwise about shaft 32, cam 138 actuates its follower 146 first, causing the first pair of side members 66 of the former unit which have the acommodating portions 67 disposed therein to move upwardly first. Shortly after this, cam 139 actuates its follower 149 causing the second pair of side members 69 of the former unit to move upwardly. It is also to be noted that cam 138 is so shaped and positioned relative to cam 139 that the first pair of side members 66 which have been started first, reach erected position prior to the erection of the second pair of side members 69. Accordingly, walls 17 of the disclosed carton blank are advanced upwardly toward setting up position prior to the advancement of walls 18 of the carton blank toward setting up position. The lag in upward movement between walls 17 and walls 18 causes the flaps 23 hinged to walls 18 and first acted upon by side members 66 to be urged into conformity with the swept back or depressed ends 91 of the side members 66, thereby insuring that the flaps 23 pass along the outside faces of walls 17. By the time walls 18 reach the point where tabs 24 are ready to engage with their tab receiving openings, walls 17 have been erected and deflected portions 22 deflected by fingers 93 to form these tab receiving openings, walls 18 then continuing their upward movement to erected position with the tabs 24 moving into engagement with their openings.

It is to be further noted that cam 139 is so shaped relative cam 138 that carton walls 18 are kept in erected position by side members 69 after side members 66 have been started on their reverse downward direction by springs 92, thus permitting the reverse moving deflecting fingers 93 to pull tabs 24 into positive engagement with the tab receiving openings in walls 17. Side members 69 are then allowed to move downwardly to flat position by their springs 92 along with side members 66. When cams 138 and 139 have passed their actuating points to cause the setting up of the carton blank as aforedescribed and the side members 66 and 69 are in flat position, cam 137 reaches its actuating point to cause ejector 108 to push the set up blank off the former unit 6. In this connection, attention is directed particularly to Figs. 6, 8 and 9 which disclose the cams 137, 138 and 139, respectively as separate units, the broken lines representing the cams in their actuating positions.

It is to be understood that during rotation of sleeve 128 and the resulting cam actuation sequence aforedescribed, the former unit 6 mounted on frame 7 is in motion between the lower end of hopper 5 and the conveyor 8. This is accomplished by means of crank arm 157 (Figs. 2 and 3) fixed at one end to the output shaft of gearing 133 and pivotally connected at the other end to one end of link arm 158. The link arm 158 has a bearing assembly 159 integral with its other end, this bearing assembly being oscillatably journalled on shaft 161, the shaft 161 being fixed to that end of frame 7 opposite the end which is pivotally journaled on main shaft 32. Stop collars 162 fixed to shaft 161 on either side of bearing assembly 159 hold the link arm 158 in proper alignment.

The crank arm 157 is positioned on the output shaft of gearing 133 in such a manner that it causes the former unit 6 to be brought into swinging cooperative relationship with the lower extremity of hopper unit 5 at the time when side members 66 and 69 are in flat position for carton blank pick off. As the crank arm 157 continues in its clockwise rotation from pick off position, the cams on sleeve 128 which is being rotated by chain 132 as aforedescribed commence their actuating sequence to set up the picked off carton blank and to eject the same as the former unit reaches the lower extremity of its crank driven stroke.

*Suction cup vacuum*

In this connection, it is to be noted that the vacuum control for causing suction cups 43 to pick off an individual blank is in operation at the point when former unit 6 reaches the lower end of hopper unit 5 for individual carton blank pick off and is inoperative at the time former unit 6 is brought into cooperative relationship with conveyor 8 to permit ejection of the set up carton blank by ejector 108 as aforedescribed.

Referring to Figs. 2, 3, 4, 19 and 34, the vacuum control system for the suction cups 43 comprises an air cylinder 163 having a reciprocable piston 164 disposed therein as is known in the art. One end of the air cylinder 163 is oscillatably attached to main shaft 32 (Fig. 3) by means of a clevis type rocker assembly 166, the spacer collars 167 and 167' fixed to shaft 32 holding the rocker assembly in proper horizontal alignment. Attached to the piston 164 of the cylinder 163 at the other end of the cylinder is a link member 168 (Fig. 3) which link member is connected to crank arm 169 fixed to the output shaft of gearing 133. The angular connection of arm 169 between the output shaft of gearing 133 and piston 164 is such that the piston 164 is timed to start its down or suction stroke in the cylinder just before the former unit 6 reaches the lower end of hopper unit 5 so that suction will be on for blank pick off. As the piston 164 passes through its downstroke, a one way floating ball type check valve 171 opened only on the downstroke of piston 164, automatically opens through suction created by piston 164, and a vacuum is created on conduit 172. The conduit 172 (Fig. 4) mounted on frame 7 is, in turn, connected to the previously mentioned conduit system 62 of the former unit 6, to thus permit the suction cups 43 on the unit to pick off an individual carton blank from the hopper unit 5 when the former unit is brought in contact therewith. A conventional gage 173 is provided in conduit 172 for the purposes of visually checking the vacuum system. Also, a conventional 3 way valve 173' is provided in line 172 for the purpose of cutting the gage in or out. The 3 way valve and gage can be omitted if so desired.

As the piston 164 progresses downwardly in cylinder 163, air and oil are caused to bleed out through a bleeder line 174 connected to the lower end of the cylinder and leading to a suitable oil collector tube 176 mounted on frame 2. Such an arrangement keeps the oil from splashing over the machine upon downstroke of piston 164. Positioned below collector tube 176 is a conventional small glass oil reservoir 177 or so-called oiler to receive the oil by gravity flow from tube 176 through the connecting conduit 178. Oil is fed from oiler 177 into the top of cylinder 163 for lubrication purposes during the suction stroke of piston 164, through a capillary conduit 179 connecting the oiler 177 with the upper part of the cylinder 163. Because of the capillary character of conduit 179, the suction effect through conduit 172 is not materially impeded, and oil flow through conduit 179 is limited to a small amount.

As the frame 7 travels downwardly, piston 164 travels downwardly therewith and the vacuum is consequently maintained on suction cups 43. In order that cups 43 can release the set up blank for ejection by ejector arm 108 when frame 7 reaches a cooperative piston with conveyor 8, means is provided to cut off the vacuum automatically by opening the vacuum supply to atmosphere just before the ejector arm 108 is actuated.

The vacuum release means comprises a conventional spring loaded vacuum breaker valve 181 associated with conduit 172, attention being directed to Figs. 4, 19 and 34. The vacuum breaker valve is adapted to be opened to atmosphere by means of a cam follower assembly 182 connected to the valve and pivotally mounted at 182' on frame 7. When frame 7 carrying former unit 6 approaches conveyor 8, the cam follower assembly 182 comes into actuating engagement with a cam track 183 fixed at a desired position on the side of frame 2, this engagement causing the cam follower 182 to lift the vacuum breaker valve 181 and open the vacuum system to atmosphere. Thus, the hold of suction cups 43 on the set up carton blank is released as the ejector arm 108 comes into engagement with the blank for ejection.

It is to be noted that on the return stroke of frame member 7, the cam follower 182 moves out of engagement with the track 183 and the vacuum breaker valve is closed, the valve 181 being spring loaded as aforementioned.

It is also to be noted that on the "up" or compression stroke of piston 164 in cylinder 163, which stroke is completed prior to the return of former unit 6 into blank pick off relation with the lower end of hopper 5, air and oil are forced from the top of the cylinder 163 through a floating ball type check valve 185 positioned in conduit 184 and opened only on the upstroke of piston 164, as the suction effect during the suction stroke of the piston maintains it automatically closed. The conduit 184, in turn, is connected to oil collector 176. Thus, splashing of oil on the frame is also prevented on the upstroke as well as the downstroke of the piston 164.

Interchangeability of formers

Fig. 30 schematically illustrates a plan view of one type of modified former unit 201 which can be generally attached to frame 7 to replace former unit 6 by means of bolts 15, and Fig. 31 illustrates a single end lock style carton blank adapted to be set up by the former unit 201 of Fig. 30.

The blank of Fig. 31 is preferably of paperboard but can be of any other suitable type of material, and is suitably scored to provide a bottom panel 202 for the tray part of the carton. Hingedly connected to bottom panel 202 along score lines 203 is a first pair of opposite walls 204; and another or second pair of opposite walls 206 and 206' extending transversely with respect to side walls 204, is hingedly connected to bottom panel 202 along score lines 207. Each wall of the first pair of opposite walls 204 is provided with a closure tab 208, the tabs being hingedly connected to walls 204 along the score lines 209.

Wall 206' of the second pair of opposite walls is provided with a first pair of end closure flaps 211, these flaps being hingedly connected to wall 206' about the score lines 212, which in effect constitute extensions of the score lines 203. Each of end closure flaps 211 is provided with a cut 213, this cut creating a deflectable portion 214 at one corner of each of the end closure flaps.

Wall 206 of the second pair of opposite walls is provided with a second pair of end closure flaps 216, these flaps being hingedly connected to wall 206 about the score lines 217, which in effect also constitute extensions of the score lines 203. Each of end closure flaps 216 has one corner provided with a locking tab 218. Wall 206 is also provided with a cover flap 219 hingedly attached thereto along score line 221 and hingedly attached to cover 219 along score line 222 is a cover closure flap 223.

In setting up a single end lock type carton blank such as that aforedescribed a former unit like that disclosed in Fig. 30 can be used. The bottom panel 202 of the blank is picked off from a hopper and held in face to face registration with the bottom member 224 of the former unit 201 by suction cups 226 disposed therein, all in a manner as previously described for former unit 6. As former unit 201 is swung downwardly to a delivery conveyor by swinging frame 7, the carton blank is set up by the unit. In this unit, it is to be noted, however, that the side members operate in a sequence different from the side member sequence of former unit 6. In operation, a first pair of opposite side members 227 hingedly connected to bottom member 224 is caused to pivot upwardly first. Each of these side members 227 is provided with a pyramidically shaped raised portion 228, the portion 228 abutting against each of the opposite walls 204 of the carton blank of Fig. 30, causing these walls 204 to move to an erected position in advance of end closure flaps 211 and 216, these closure flaps also being moved upwardly toward an erected position by side members 227. After walls 204 and closure flaps 211 and 216 have been started toward erected position, wall 206' is caused to move upwardly by side member 229, also hingedly connected to bottom member 224. The erection of wall 206' immediately succeeding the erection of walls 204 causes the end closure flaps 211 to be moved inwardly against the outside faces of walls 204.

As the end closure flaps 211 approach erected position, the deflectable tab portions 214 of these flaps pass between the outer face of erected carton walls 204 and the raised pyramids 228 of side members 227. As a result of this the deflectable portions 214 of flaps 211 are held firmly against the outer faces of walls 204 and the remaining portions of closure flaps 211 tend to spring away from the outer faces of walls 204 due to the natural resiliency of these flaps. Thus, tab receiving openings are formed in the closure flaps 211 as side member 229 moves wall 206' to erected position. Shortly after these tab receiving openings are formed, locking tabs 218 on end closure flaps 216 are caused to come into engagement with these openings through the upward erection of carton wall 206 by side member 231 hingedly connected to bottom member 224 opposite side member 229. In this connection, it is to be noted that as wall 206 is erected, end closure flaps 216 are caused to turn inwardly and overlap the outer side of end closure flaps 211, the locking tabs 218 attached to flaps 216 passing between deflectable portions 214 and raised portions 228 into locking engagement with their tab receiving openings.

From Fig. 30, it can be seen that the former unit 201 is for the most part like former unit 6 with respect to timed operations of side members 227, 229 and 231 and the suction means to fixedly hold the bottom wall on the former while the carton side walls are set up. Therefore, substantially the same type of cam actuating mechanism can be used to erect the side members of former unit 201 as was used for unit 6. The main difference between the former of Fig. 30 and former 6, is that in the Fig. 30 former, interlocking of the carton side walls is effected solely by the contour of the movable former side members comprising the substantially pyramidal portions 228 on opposite members 227.

In operation of former unit 201, it is desirable to raise side member 229 before side member 231 in order to properly form the single end lock. Accordingly, it will be obvious that separate cam units are desirable for sequential actuation of members 229 and 231, and, as aforementioned, additional rod openings 151 are provided in the frame member 7 for such operation.

Thus, it can be seen that with the present invention, it is possible to change quickly from one type former unit to another, using the same overall setting up apparatus and requiring a minimum change of parts on the swinging frame.

I claim:

1. A machine for setting up carton blanks comprising hopper means for supporting a stack of blanks from which the blanks are adapted to be removed one at a time; former mechanism comprising movable members for setting up the successive blanks, means for removing the successive blanks from the stack, self contained mechanism for operating said movable members, and a face at which elements of said operating mechanism are exposed for actuation; a movable structure for supporting and moving said former mechanism toward said stack for pick off of successive blanks and having a face against which said former mechanism face can abut; means for detachably securing said former mechanism to said movable structure with said faces in engagement; and actuating mechanism at said movable structure face for actuating said elements whereby former mechanisms for different blanks can be quickly interchanged.

2. A machine for setting up carton blanks comprising hopper means to hold said carton blanks, former means for setting up said carton blanks, means for moving one of said means relative the other, vacuum means positioned on said former means to transfer blanks from said hopper means to said former means, and means including a diaphragm supporting said vacuum means and providing a limited universal mount for said vacuum means on said former means to provide both lateral and up and down movement of said vacuum means.

3. A machine for setting up carton blanks comprising hopper means to hold said carton blanks, former means for setting up said carton blanks, means for moving one of said means into cooperative relationship relative the other, a plurality of spaced apart suction cups, means including a diaphragm supporting each of said cups and providing a limited universal mount for such cup on said former means to provide both lateral and up and down movement of said suction cups, and a vacuum system connected to said cups to cause said cups to transfer carton blanks individually from said hopper means to said former means when moved into such cooperative relationship.

4. A machine for setting up carton blanks comprising hopper means to hold said carton blanks, former means for setting up said carton blanks, means for moving one of said means into cooperative relationship with the other, a suction cup including a base and stem portion positioned at each of the corners of the base portion of said former means, means including a diaphragm supporting each of said cups and providing a limited universal mount for such cup on said former means to provide both lateral and up and down movement of said suction cups, the base portion of each cup normally projecting above a face of said base portion of said former means and the stem portion projecting downward into said base of said former means to permit ready contact of said cup base with the portion of a carton blank in said hopper when said former means and said hopper means are positioned in cooperative relationship, and means including a vacuum system cooperating with the stem of each of said cups to cause said cups to pick off an individual blank when in such cooperating relationship and to move said cups inwardly toward the plane of the base portion of said former means to bring the panel portion of a picked off blank into mating relationship with said face of the base portion of said former means.

5. A machine for setting up carton blanks comprising hopper means to hold said carton blanks, former means for setting up said carton blanks, means for moving one of said means relative the other, transfer means to transfer said blanks from said hopper means to said former means in proper mating alignment, said former means including a side member having a portion to accommodate a deflectable wall portion on a wall of each of said carton blanks, a deflecting finger adjacent said side member on said former means, and means supporting said finger for movement into cooperative relationship with said accommodating portion.

6. A machine for setting up carton blanks comprising hopper means to hold said carton blanks, former means for setting up said carton blanks, means for moving one of said means relative to the other, transfer means to transfer said blanks from said hopper means to said former means in proper mating alignment, said former means including a first side member having a portion to accommodate a deflectable wall portion on a first wall of each of said carton blanks to form a tab receiving opening in said wall, a deflecting finger adjacent said side member on said former means, means supporting said finger for movement over and across the top edge of said side member, means for moving said finger to cause an end thereof to move into cooperative relationship with said accommodating portion to deflect said deflectable portion on said first wall to form a tab receiving opening in said wall, and a second side member on said former means cooperable with said first side member to cause a tab portion on an immediately adjacent second wall of each of said carton blanks to enter said tab receiving opening.

7. A machine for setting up carton blanks comprising hopper means to hold said carton blanks, former means for setting up said carton blanks, means for moving one of said means relative to the other, transfer means to transfer said blanks from said hopper means to said former means in proper mating alignment, said former means including a first side member having a portion to accommodate a deflectable wall portion on a first wall of each of said carton blanks to form a tab receiving opening in said wall, a deflecting finger adjacent said side member on said former means, means supporting said finger for movement over and across the top edge of said side member, means for moving said finger to cause an end thereof to move into cooperative relationship with said accommodating portion of said first side member and to deflect said deflectable portion on said first wall to form a tab receiving opening in said wall, a second side member on said former means cooperable with said first side member, means to move said second side member when said finger is in deflecting position to cause a tab portion on an immediately adjacent second wall of each of said carton blanks to pass over said deflecting finger and enter said tab receiving opening in said first wall, and means to move said deflecting finger out of cooperative relationship with said accommodating portion, said deflecting finger being shaped to pull said tab into positive engagement with said tab receiving opening when moved out of said cooperative relationship.

8. A machine for setting up carton blanks comprising hopper means to hold said carton blanks, said hopper means including blank orientating means cooperable therewith to align a stack of said carton blanks, a former means for setting up each of said carton blanks, means pivotally mounting said former means adjacent one end thereof for swinging movement relative to said hopper means, means to swing said former means into blank transferring relationship with one end of said hopper means, vacuum means positioned on said former means to transfer blanks individually from said hopper means to said former means during such relationship, said former means including a side member having a portion to accommodate a deflectable wall portion on a wall of each of said carton blanks, a deflecting finger adjacent said side member on said former means, and means for moving said finger to cause an end thereof to move into cooperative relationship with said accommodating portion.

9. A machine for setting up a carton blank of the type having a bottom panel, a first pair of opposite walls hingedly connected to said bottom panel each of which is formed with a lock forming cut adjacent each end thereof providing a deflectable wall portion adjacent such end, and a second pair of opposite walls hingedly connected to said bottom panel and extending transversely with respect to said first pair of walls, each of said second pair of walls having a hingedly connected end flap adjacent each end thereof having a locking tab adapted to be received in an opening formed at each lock forming cut when the deflectable wall portion adjacent such cut is deflected outwardly; comprising hopper means to hold said carton blanks, former means for setting up said carton blanks, means for moving one of said means relative the other, transfer means to transfer blanks from said hopper means to said former means, said former means having a first pair of opposite side members, each of said side members having portions to accommodate deflectable wall portions of the first pair of carton walls when said wall portions are deflected to provide the tab receiving openings in each of said first pair of carton walls, a second pair of opposite side members extending transversely with respect to said first pair of opposite side members cooperable with said second pair of opposite carton walls, means for moving said side members upwardly for folding said carton walls upwardly adjacent said side members to effect setting up of all of said carton walls and bending of said end flaps adjacent said first pair of side members, and means comprising a pair of movable deflecting fingers adjacent each of said first pair of side members cooperable with said accommodating portions of such side members for deflecting said deflectable carton wall portions into said accommodating portions to form said tab receiving openings.

10. A machine for setting up a carton blank of the type having a bottom pane, a first pair of opposite walls hingedly connected to said bottom panel each of which is formed with a lock forming cut adjacent each end thereof providing a deflectable wall portion adjacent such end, and a second pair of opposite walls hingedly connected to said bottom panel and extending transversely with respect to said first pair of walls, each of said second pair of walls having a hingedly connected end flap adjacent each end thereof having a locking tab adapted to be received in an opening formed at each lock forming cut when the deflectable wall portion adjacent such cut is deflected outwardly; comprising hopper means to hold said carton blanks, former means for setting up said carton blanks, means for moving one of said means relative the other, transfer means to transfer blanks from said hopper means to said former means, said former means having a first pair of opposite side members, each of said side members having portions adapted to accommodate deflectable wall portions of the first pair of carton walls when said wall portions are deflected to provide the tab receiving openings in each of said first pair of carton walls, a second pair of opposite side members extending transversely with respect to said first pair of opposite side members cooperable with said second pair of opposite carton walls, means for moving said side members upwardly for folding said carton walls upwardly adjacent said side members to effect setting up of all of said carton walls and bending of said end flaps adjacent said first pair of side members, a pair of deflecting fingers adjacent each of said first pair of side members cooperable with said accommodating portions of such side members, means movably supporting each of said fingers adjacent one end thereof for movement over and across the top of the side member, and means for moving said fingers to cause the opposite ends thereof to cooperate with said accommodating portions to deflect said deflectable carton wall portions into said accommodating portions to form said tab receiving openings.

11. The apparatus of claim 10, said means for folding said carton walls upwardly including a first means to fold said first pair of opposite carton walls to erected position prior to the folding of said second pair of carton walls to erected position, a second means to fold said second pair of opposite carton walls to erected position after said deflectable wall portions have been deflected by said fingers to cause said tab portions on said second pair of walls to pass over said deflecting fingers and enter side wall openings created by said deflecting fingers, and means to move said deflecting fingers out of cooperative relationship with said accommodating portions against said tabs to pull said tabs into positive engagement in said openings.

12. A machine for setting up a carton blank of the type having a bottom panel, a first pair of opposite walls hingedly connected to said bottom panel each of which is formed with a lock forming cut adjacent each end thereof providing a deflectable wall portion adjacent such end, and a second pair of opposite walls hingedly connected to said bottom panel and extending transversely with respect to said first pair of walls, each of said second pair of walls having a hingedly connected end flap adjacent each end thereof having a locking tab adapted to be received in an opening formed at each lock forming cut when the deflectable wall portion adjacent such cut is deflected outwardly; comprising hopper means to hold said carton blanks, said hopper means including blank orientating means cooperable therewith to align a stack of said carton blanks, former means for setting up each of said carton blanks, means pivotally mounting said former means adjacent an end thereof for swinging movement relative to said hopper means, means to swing said former means into blank transferring relationship with one end of said hopper means, vacuum means positioned on said former means to transfer blanks individually from said hopper means to said former means during such relationship, said former means having a first pair of opposite side members, each of said side members having portions to accommodate deflectable wall portions of the first pair of carton walls when said wall portions are deflected to provide the tab receiving openings in each of said first pair of carton walls, a second pair of opposite side members extending transversely with respect to said first pair of opposite side members cooperable with said second pair of opposite carton walls, means for moving said side members upwardly for folding said carton walls upwardly adjacent said side members to effect setting up of all of said carton walls and bending of said end flaps adjacent said first pair of side members, and means comprising a pair of movable deflecting fingers adjacent each of said first pair of side members cooperable with said accommodating portions of such side members for deflecting said deflectable carton wall portions into said accommodating portions to form said tab receiving openings.

13. A machine for setting up a carton blank of the type having a bottom panel, a first pair of opposite walls hingedly connected to said bottom panel each of which is formed with a lock forming cut adjacent each end thereof providing a deflectable wall portion adjacent such end, and a second pair of opposite walls hingedly connected to said bottom panel and extending transversely with respect to said first pair of walls, each of said second pair of walls having a hingedly connected end flap adjacent each end thereof having a locking tab adapted to be received in an opening formed at each lock forming cut when the deflectable wall portion adjacent such cut is deflected outwardly; comprising hopper means to hold said carton blanks, said hopper means including blank orientating means cooperable therewith to align a stack of said carton blanks, former means for setting up each of said carton blanks, means pivotally mounting said former means adjacent one end thereof for swinging movement relative to said hopper means, means to swing said former means through an arcuate path into blank transferring relationship with the bottom end of said hopper means, vacuum means positioned on said former means to transfer blanks individually from said hopper means to said former means during such relationship, said former means having a bottom portion to cooperate with the bottom panel of said blank, a first pair of opposite side members hingedly connected to said bottom portion, each of said side members having portions to accommodate deflectable wall portions of the first pair of carton walls when said wall portions are deflected to provide the tab receiving openings in each of said first pair of carton walls, a second pair of opposite side members hingedly connected to said bottom portion extending transversely with respect to said first pair of opposite side members cooperable with said second pair of opposite carton walls, means to pivot said first and second pair of opposite side members upwardly to fold said carton walls upwardly adjacent said side members to effect setting up of all of said carton walls and bending of said end flaps adjacent said first pair of side members, and means comprising a pair of movable deflecting fingers adjacent each of said first pair of side members cooperable with said accommodating portions of such side members for deflecting said deflectable carton wall portions into said accommodating portions to form said tab receiving openings.

14. In a carton blank transfer member adapted to cooperate with a carton hopper, said transfer member having a flat carton supporting surface thereon, a blank pick-off apparatus for picking off individual carton blanks from said carton hopper comprising a plurality of spaced apart suction cups, means including a diaphragm supporting each of said suction cups and providing a limited universal mount for such suction cup on said transfer member to provide both lateral and up and down movement of said suction cups, and a vacuum system connected to said cups to cause said cups to pick-off a blank from said hopper when said transfer member is moved into cooperative relationship with said hopper and to bring said blank into flat mating relation with said flat surface of said transfer member.

15. In a carton blank transfer member adapted to cooperate with a carton hopper, said transfer member having a flat carton supporting surface thereon, a blank pick-off apparatus for picking off individual carton blanks from said carton hopper comprising suction cups, each positioned at a corner of said supporting surface, means including a diaphragm supporting each of said suction cups and providing a limited universal mount for such suction cup on said transfer member to provide both lateral and up and down movement of said suction cups, said suction cups having their base portions normally projecting above said supporting surface of said transfer member to permit contact of said base portions with a panel portion of a carton blank positioned in said hopper when said transfer member cooperates with said hopper, the stem portions of said cups projecting downward in said transfer member and a vacuum system connected to a stem of each of said cups to cause said cups to pick-off a blank from said hopper when said transfer member is moved into cooperative relationship with said hopper and to bring said blank into flat mating relation with said flat surface of said transfer member.

16. In a sheet material pick-off mechanism having a face on which a sheet is adapted to be supported, said face having an opening, a suction cup in said opening, a hollow stem structure upon which the cup is mounted, a suction chamber in said mechanism into which said stem structure extends, a flexible diaphragm sealing said chamber, means supporting said stem structure on said diaphragm in sealed relationship therewith, said diaphragm providing a limited universal mount for said stem structure and cup, resilient means for urging said cup normally above said face, and means for applying suction to said chamber so that when the cup engages said sheet it will seal against the sheet and the suction on the diaphragm will move the diaphragm together with the cup to hold the sheet in engagement with said face until the suction is released.

17. The sheet material pick-off mechanism of claim 16 comprising a plurality of openings in each of which is located a suction cup and associated flexible diaphragm structure.

18. The sheet material pick off mechanism of claim 16 in which said flexible diaphragm is bowed to provide additional lateral as well as up and down movement of said suction cup.

19. In a former means for setting up a carton blank, said former means having a bottom, a first side member having a portion to accommodate a deflectable wall portion on a first wall of a carton blank to form a tab receiving opening in said carton wall, means mounting said side member for movement from a substantially planar position to an upright position relative to said former bottom, a single deflecting finger in line with such accommodating portion adjacent said side member on said former means, means supporting said finger on said side member for movement over and across the top edge of said side member, means for moving said finger in timed relation with movement of said side member to cause an end thereof to move into cooperative relationship with said recessed portion of said first side member to deflect said deflectable portion on said first carton wall, a second side member cooperable with said first side member, means to move said second side member when said finger is in deflecting position to cause a tab portion on an immediately adjacent second wall of said carton blank to pass over said deflecting finger and enter said tab receiving opening in said first wall of said carton blank, means to move said deflecting finger in an arcuate direction out of cooperative relationship with said accommodating portion against said tab to pull said tab into positive engagement with said tab receiving opening, and suction means for positively holding said carton blank on said former bottom during substantially the entire setting up of the carton blank.

20. In a former means for setting up a carton blank of the type having a bottom panel, a first pair of opposite walls hingedly connected to said bottom panel each of which is former with a lock forming cut adjacent each end thereof providing a deflectable wall portion adjacent such end, and a second pair of opposite walls hingedly connected to said bottom panel and extending transversely with respect to said first pair of walls, each of said second pair of walls having a hingedly connected end flap adjacent each end thereof having a locking tab adapted to be received in an opening formed at each lock forming cut when the deflectable wall portion adjacent such cut is deflected outwardly; said former means comprising a bottom member adapted to cooperate with the bottom panel of said carton blank, a first pair of opposite side members, hingedly connected to said bottom member, each of said side members having portions to accommodate deflectable wall portions of the first pair of carton walls when said wall portions are deflected to provide the tab receiving openings in each of said first pair of carton walls, a second pair of opposite side members hingedly connected to said bottom member, extending transversely with respect to said first pair of opposite side members cooperable with said second pair of opposite carton walls, means to pivot said first and second pairs of opposite side members upwardly to fold said carton walls upwardly adjacent said side members to effect setting up all of said carton walls and bending of said end flaps adjacent said first pair of side members, a pair of single deflecting fingers adjacent each of said first pair of side members cooperable with said accommodating portions of such side members, means movably supporting each of said fingers on such side member adjacent one end thereof for movement over and across the top of the side member, means for moving each of said fingers in timed relation with movement of the side member to cause the opposite ends thereof to move into cooperative relationship with said accommodating portions to deflect said deflectable carton wall portions into said accommodating portions to form said receiving openings, said means for folding said carton walls upwardly including a first means to fold said first pair of opposite carton walls to erected position prior to the folding of said second pair of carton walls to erected position and a second means to fold said second pair of opposite carton walls to erected position after said deflectable wall portions have been deflected by said fingers to cause said tab portions on said second pair of walls to pass over said deflecting fingers and enter side wall openings created by said deflecting fingers, means to move said deflecting fingers in an arcuate direction out of cooperative relationship with said accommodating portions against said tabs to pull said tabs into positive engagement in said openings, and suction means for positively holding said carton blank on said former bottom during substantially the entire setting up of the carton blank.

21. In a hopper for a stack of sheets having an opening through which the sheets are adapted to be removed one at a time by movable mechanism engageable with successive sheets at said opening, a plurality of overlapping flexible fingers mounted on said hopper at each of opposite sides of the stack, said flexible fingers being secured at their upper ends with their lower ends free and spaced apart adjacent said hopper opening, the lower ends of said fingers being inturned towards said hopper opening and engageable with edges of the sheets.

22. In a hopper for a stack of sheets having an opening through which the sheets are adapted to be removed one at a time by movable mechanism engageable with successive sheets at said opening, a plurality of overlapping flexible fingers mounted on said hopper at each of opposite sides of the stack, said flexible fingers being secured at their upper ends with their lower ends free and spaced apart adjacent said hopper opening and engageable with edges of the stack, said finger ends being inturned and slanting downwardly toward said opening.

23. A carton forming device for setting up and interlocking hinged walls of a carton blank in which a first wall has a deflectable portion to provide a locking opening into which a locking tab on an adjacent second wall is adapted to project, comprising a bottom member, a first former member movably mounted on said bottom member and erectable from a flat position to an upright position to set-up said first wall and having a portion for accommodating said deflectable portion in said first wall, a second former member movably mounted on said bottom member and erectable from a flat position to an upright position to set-up said second wall and move said locking tab toward said opening, a single finger in line with said accommodating portion and mounted on said first former member for movement over and across the top edge of such member for deflecting said deflectable wall portion, means for moving said finger into said accommodating portion in timed relationship with movement of said first former member, said finger having a laterally extending portion for pulling the tab into positive locking engagement with said locking opening upon movement of said finger away from said accommodating portion, means for moving said finger in an arcuate direction away from said accommodating portion, and suction means for positively holding said carton blank on said bottom former member during substantially the entire setting up of said carton blank.

24. A machine for setting up carton blanks comprising a supporting structure upon which a self-contained carton blank setting up device is adapted to be mounted, said supporting structure having an abutment face and means on said face providing for detachable support of said device in abutment with said face, and actuating mechanism for said device terminating adjacent said face whereby setting up devices for different blanks can be quickly interchanged.

25. In a former member for setting up carton blanks of the type having a bottom panel, a first pair of opposite walls hingedly connected to said bottom panel each of which is formed with a lock forming cut adjacent each end thereof providing a deflectable wall portion adjacent such end, and a second pair of opposite walls hingedly connected to said bottom panel and extending transversely with respect to said first pair of walls, each of said second pair of walls having a hingedly connected end flap adjacent each end thereof having a locking tab adapted to be received in an opening formed at each lock forming cut when the deflectable wall portion adjacent such cut is deflected outwardly; a bottom member, vacuum means floatingly and resiliently disposed in said bottom member to cooperate with the bottom panel of said carton blank, a first pair of opposite side members hingedly connected to said bottom member, each of said side members having accommodating portions to accommodate deflectable wall portions of the first pair of carton walls when said wall portions are deflected to provide the tab receiving openings in each of said first pair of carton walls and each of said side members also having swept back end portions to further accommodate the end flaps of said second pair of walls, a second pair of opposite side members hingedly connected to said bottom member, extending transversely with respect to said first pair of opposite side members between said swept back end portions on said first pair of side members, and cooperable with said second pair of opposite carton walls, means to pivot said first and second pair of opposite side members upwardly adjacent said side members to effect setting up all of said carton walls and bending of said end flaps into said swept back end portions adjacent said first pair of side members, and means comprising a pair of movable deflecting fingers adjacent each of said first pair of side members cooperable with said accommodating portions of such side members for deflecting said deflectable carton wall portions into said accommodating portions to form said tab receiving openings for said tabs on said end flaps.

26. A carton forming device for setting up and interlocking hinged walls of a carton blank comprising a bottom member, a plurality of former side members movably mounted on said bottom member and erectable from a substantially flat position to an upright position, the inner surfaces of the side members having raised portions of such contour as to provide the sole means for effecting interlocking of the carton side walls upon erection of said side members in timed relationship.

27. A carton forming device for setting up and interlocking hinged walls of a carton blank, comprising a bottom member, a plurality of former side members movably mounted on said bottom member and erectable from a susbtantially flat position to an upright position, the inner surfaces of the side members being of such contour as to provide the sole means for effecting interlocking of the carton side walls upon erection of said side members in timed relationship, said inner surfaces including on each of a pair of opposite side members a substantially pyramidically shaped raised portion.

28. A machine for setting up carton blanks, comprising hopper means to hold carton blanks from which the blanks are adapted to be successively removed one at a time; former means for setting up the blanks, said former means including a bottom member adapted to register with a bottom panel of a blank, movable side members hingedly connected to said bottom member for erecting side walls of a blank and self contained mechanism for operating said movable members; means for moving one of said means relative to the other; and vacuum means positioned on said bottom member of said former means to transfer successive blanks from said hopper means to said former means.

29. A machine according to claim 27 in which said vacuum means is universally mounted on said bottom member for both lateral and up and down movement to provide uniform registration of said panel of said blank with said bottom member.

30. A carton blank pick off device comprising a suction cup adapted to pick off a carton blank from a stack of such blanks by suction, a support for said suction cup, a vacuum system attached to said suction cup for applying suction to pick up a blank, and means including a diaphragm mounting said suction cup on said support for limited universal movement to provide lateral as well as up and down movement of said suction cup for effecting uniform engagement thereof on a blank.

31. A machine for setting up carton blanks comprising a supporting structure having mounting means upon which a carton blank setting up device having actuatable mechanism is adapted to be detachably mounted, and actuating mechanism on said supporting structure for actuating said actuatable mechanism of said carton blank setting up device, said actuating mechanism terminating adjacent said mounting means on said supporting structure whereby setting up devices for different blanks can be quickly interchanged.

32. A machine for setting up flat carton blanks of the type having a bottom wall, and pairs of opposite side walls hingedly connected to said bottom wall and extending outwardly therefrom in the plane of said bottom wall, said side walls having cooperating means for holding said side walls together in the set up condition of said carton when the side walls are moved to an upright position relative to said bottom wall; said machine comprising hopper means located at one station for holding a stack of such carton blanks, former means at another station for setting up said carton blanks and allowing discharge of set up cartons therefrom, said former means including a bottom member adapted to register with the bottom wall of each carton blank and side members hingedly connected to said bottom member and movable to an upright position relative to said bottom member for setting up the side walls of such carton blank, transfer mechanism cooperable with said hopper means and said former means and mounted for movement between said stations including suction cup means for transferring a carton blank from said hopper means to said former means, means for moving the side members of said former means to upright position with respect to the bottom member of said former means, means automatically timing operation of said suction means with the operation of said former means for maintaining suction on said suction means during the entire period of transfer of each carton blank from said hopper means to said former means and maintaining the bottom wall of such carton blank positively and directly in fixed engagement with the bottom member of said former means during the time the side members of said former means are moved upright to set up the side walls of the carton.

References Cited in the file of this patent

UNITED STATES PATENTS

| | | |
|---|---|---|
| 1,476,954 | Denmire | Dec. 11, 1923 |
| 1,942,885 | Tevander | Jan. 9, 1934 |
| 2,016,814 | Ferguson | Oct. 8, 1935 |
| 2,017,583 | Burrow | Oct. 15, 1935 |
| 2,163,274 | Dixon | June 20, 1939 |
| 2,420,417 | Cutler | May 13, 1947 |
| 2,580,189 | Pagendarm | Dec. 25, 1951 |
| 2,598,569 | Leukoff | May 27, 1952 |
| 2,655,843 | Baker et al. | Oct. 20, 1953 |
| 2,657,049 | Baker | Oct. 27, 1953 |
| 2,708,862 | Perilli | May 24, 1955 |
| 2,743,651 | Wilcox | May 1, 1956 |

UNITED STATES PATENT OFFICE

CERTIFICATE OF CORRECTION

Patent No. 2,869,439                                                  January 20, 1959

William H. Wilcox

It is hereby certified that error appears in the printed specification of the above numbered patent requiring correction and that the said Letters Patent should read as corrected below.

Column 4, line 62, for "none-erected" read -- non-erected --; column 24, line 43, for "former" read -- formed --; line 55, after "members" strike out the comma; column 27, line 1, for the claim reference numeral "27" read -- 28 --.

Signed and sealed this 19th day of May 1959.

(SEAL)
Attest:

KARL H. AXLINE
Attesting Officer

ROBERT C. WATSON
Commissioner of Patents